US012756586B2

(12) United States Patent
Muños De La Torre Alonso

(10) Patent No.: US 12,756,586 B2
(45) Date of Patent: Oct. 6, 2026

(54) METHODS FOR SUPPORTING USER NOTIFICATION SERVICES FOR EVENTS IN A NETWORK

(71) Applicant: Telefonaktiebolaget LM Ericsson (publ), Stockholm (SE)

(72) Inventor: Miguel Angel Muños De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 548 days.

(21) Appl. No.: 18/028,923

(22) PCT Filed: Nov. 10, 2020

(86) PCT No.: PCT/EP2020/081653
§ 371 (c)(1),
(2) Date: Mar. 28, 2023

(87) PCT Pub. No.: WO2022/078616
PCT Pub. Date: Apr. 21, 2022

(65) Prior Publication Data

US 2023/0379677 A1 Nov. 23, 2023

(30) Foreign Application Priority Data

Oct. 13, 2020 (EP) .................................... 20382898

(51) Int. Cl.
*H04L 12/00* (2006.01)
*H04L 12/14* (2006.01)
(Continued)

(52) U.S. Cl.
CPC ...... *H04L 12/1407* (2013.01); *H04L 41/0893* (2013.01); *H04L 41/0894* (2022.05); *H04W 4/50* (2018.02)

(58) Field of Classification Search
CPC ............. H04L 12/1407; H04L 41/0893; H04L 41/0894; H04L 41/0686; H04W 4/50;
(Continued)

(56) References Cited

U.S. PATENT DOCUMENTS

| | | | | |
|---|---|---|---|---|
| 2020/0092423 | A1* | 3/2020 | Qiao | H04W 80/10 |
| 2022/0377529 | A1* | 11/2022 | Kim | H04W 8/08 |
| 2023/0422004 | A1* | 12/2023 | Gonzalez | H04M 15/66 |
| 2024/0187968 | A1* | 6/2024 | Tiwari | H04W 8/20 |
| 2024/0323886 | A1* | 9/2024 | Hoffner | H04W 12/06 |
| 2024/0357623 | A1* | 10/2024 | Li | H04W 72/30 |

OTHER PUBLICATIONS

International Search Report and Written Opinion of the International Searching Authority, PCT/EP2020/081653, mailed Jun. 25, 2021, 18 pages.

(Continued)

*Primary Examiner* — Pakee Fang
(74) *Attorney, Agent, or Firm* — Sage Patent Group

(57) ABSTRACT

There is provided a method for handling events in a network. The method is performed by a first network node. The first network node is external to the network and is configured to communicate with the network via a second network node that is internal to the network. The method includes initiating transmission of a first request towards the second network node. The first request includes information indicative that the first network node supports a user notification service that notifies one or more user equipments of events in the network.

9 Claims, 13 Drawing Sheets

(51) Int. Cl.
*H04L 41/0893* (2022.01)
*H04L 41/0894* (2022.01)
*H04W 4/50* (2018.01)

(58) Field of Classification Search
CPC ......... H04W 4/24; H04W 8/00; H04W 80/08; H04W 84/042; H04M 15/8055; H04M 15/00; H04M 15/66; H04M 15/8033; H04M 15/8038; H04M 15/8044; H04M 15/8083; H04M 15/83; H04M 15/85; H04M 15/851; H04M 15/852; H04M 15/854
See application file for complete search history.

(56) References Cited

OTHER PUBLICATIONS

3GPP TS 29.522 v16.4.0 (Jun. 2020); 3rd Generation Partnership Project; Technical Specification Group Core Network and Terminals; 5G System; Network Exposure Function Northbound APIs; Stage 3 (Release 16); 159 pages.
3GPP TS 23.501 v16.6.0 (Sep. 2020); 3rd Generation Partnership Project; Technical Specification Group Services and System Aspects; System architecture for the 5G System (5GS); Stage 2 (Release 16), 447 pages.
3GPP TS 23.502 v16.6.0 (Sep. 2020); 3rd Generation Partnership Project; Technical Specification Group Services and System Aspects; Procedures for the 5G System (5GS); Stage 2 (Release 16); 597 pages.

* cited by examiner

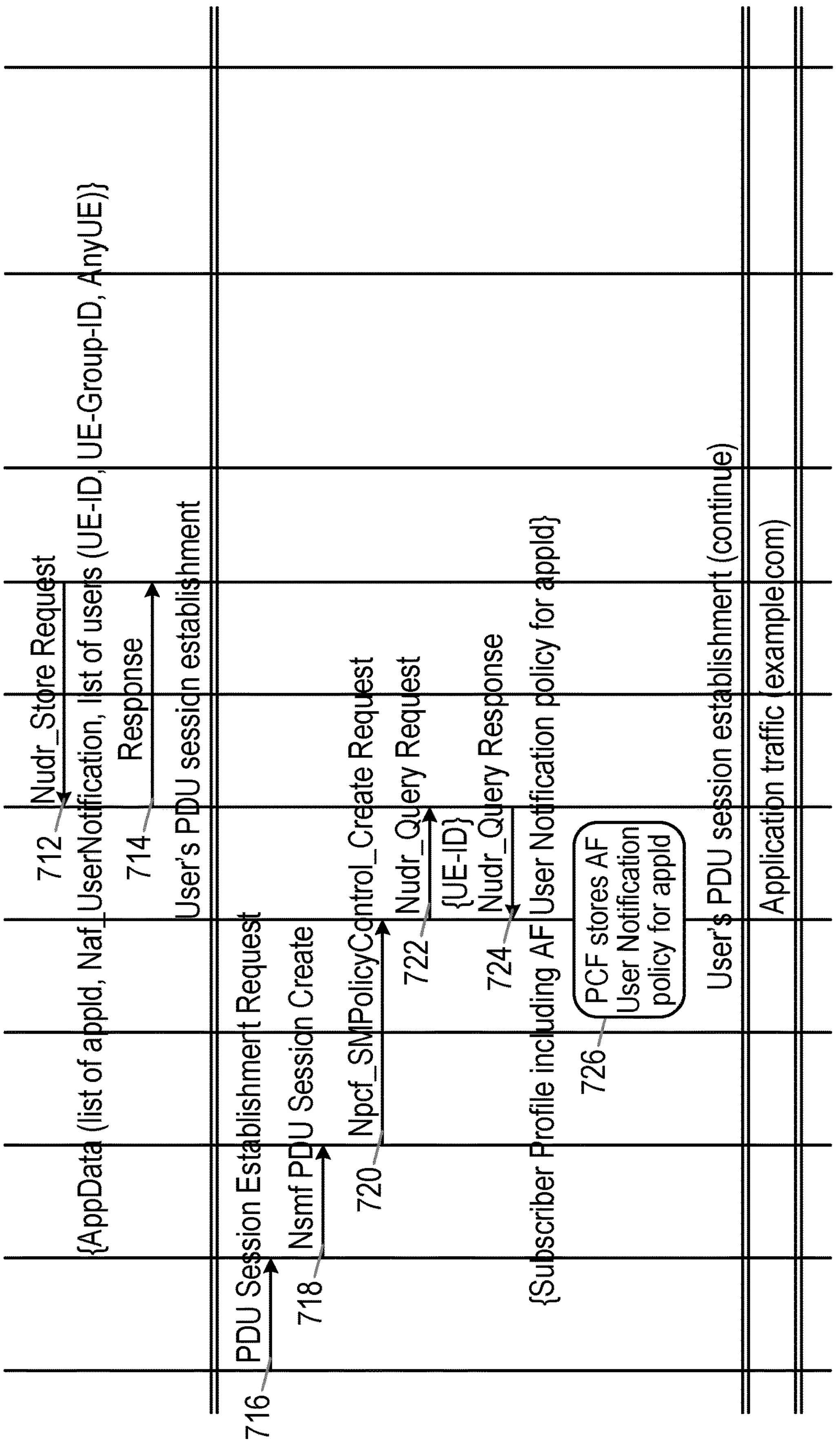
Figure 12 *(continued)*

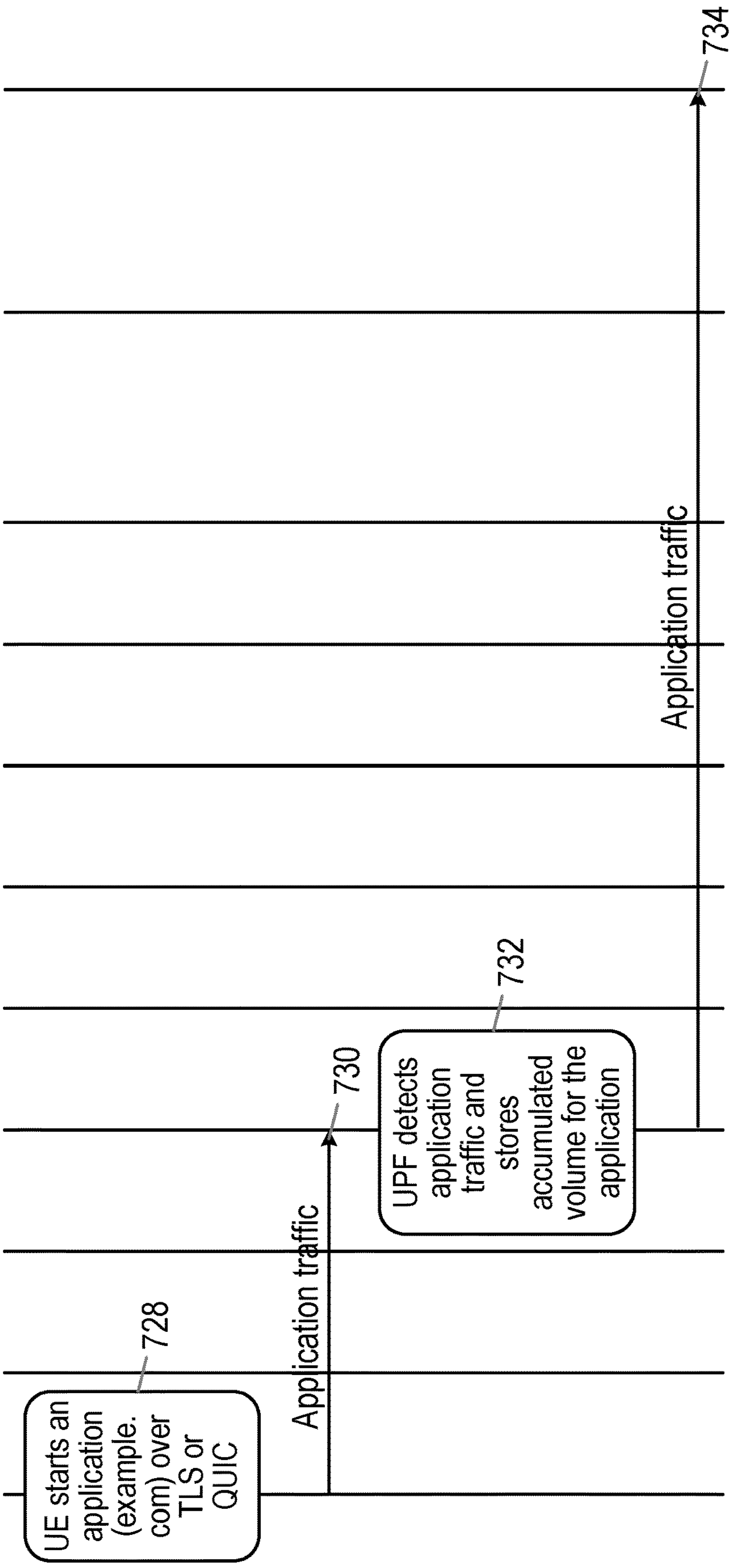
Figure 12 *(continued)*

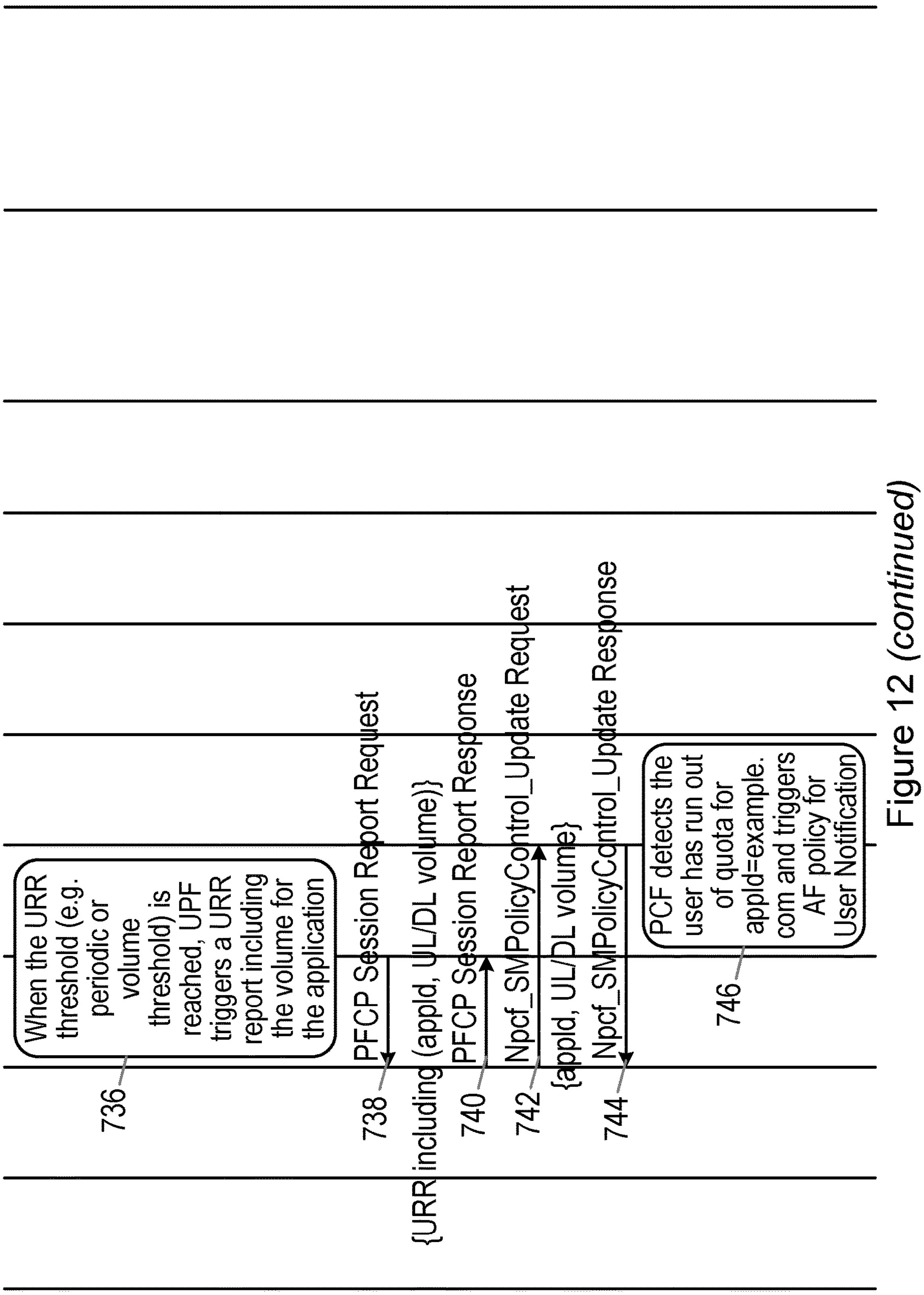
Figure 12 *(continued)*

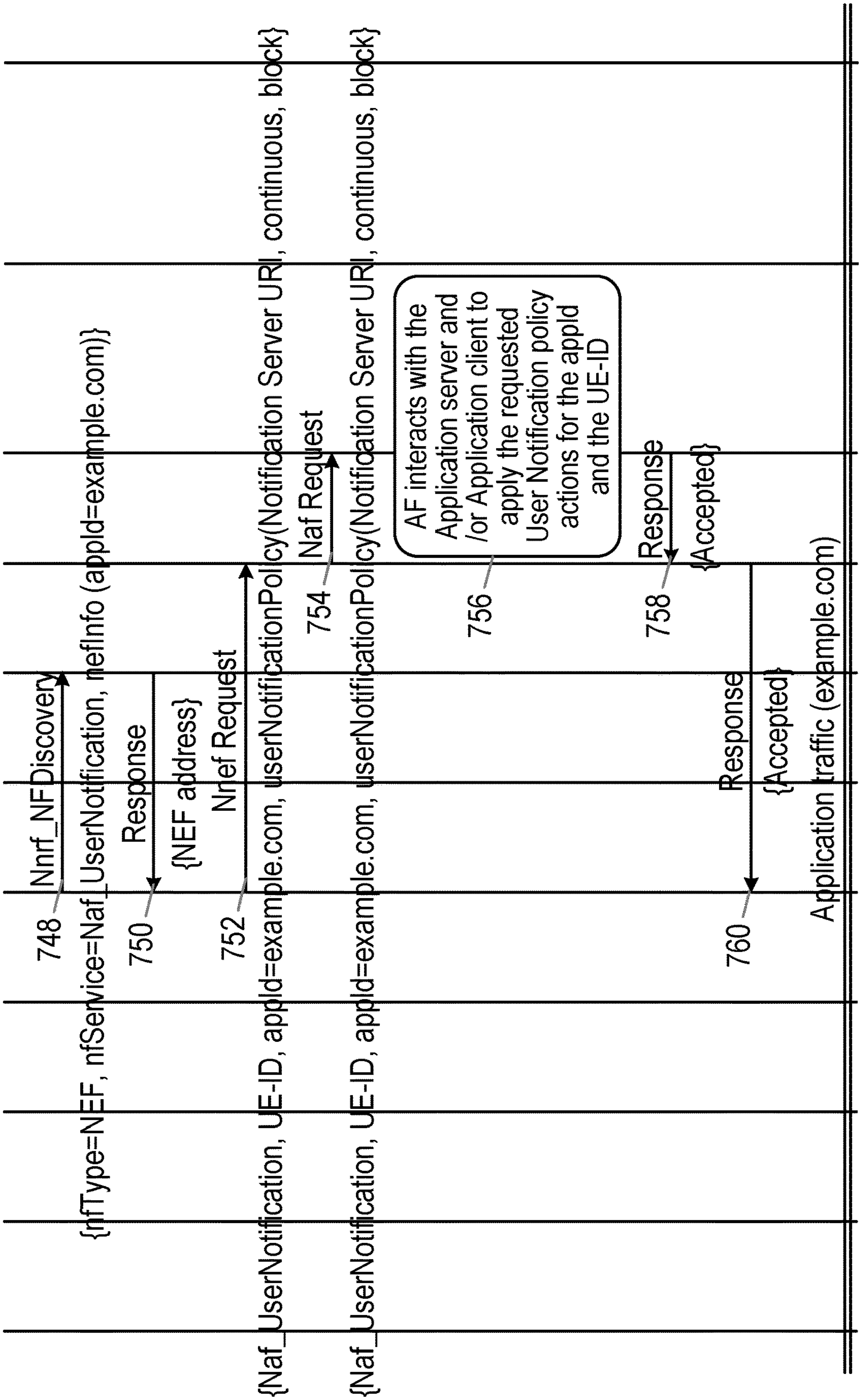
Figure 12 *(continued)*

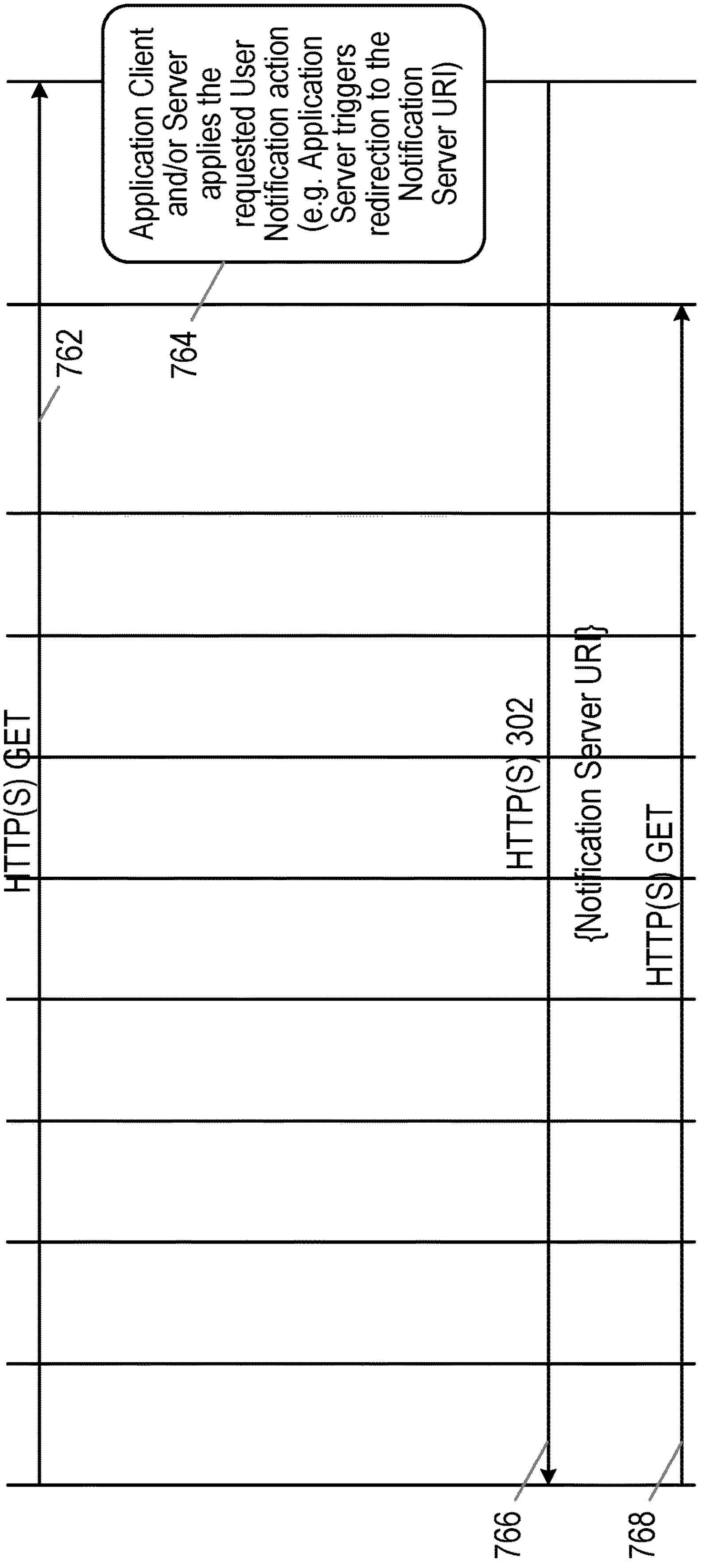
Figure 12 *(continued)*

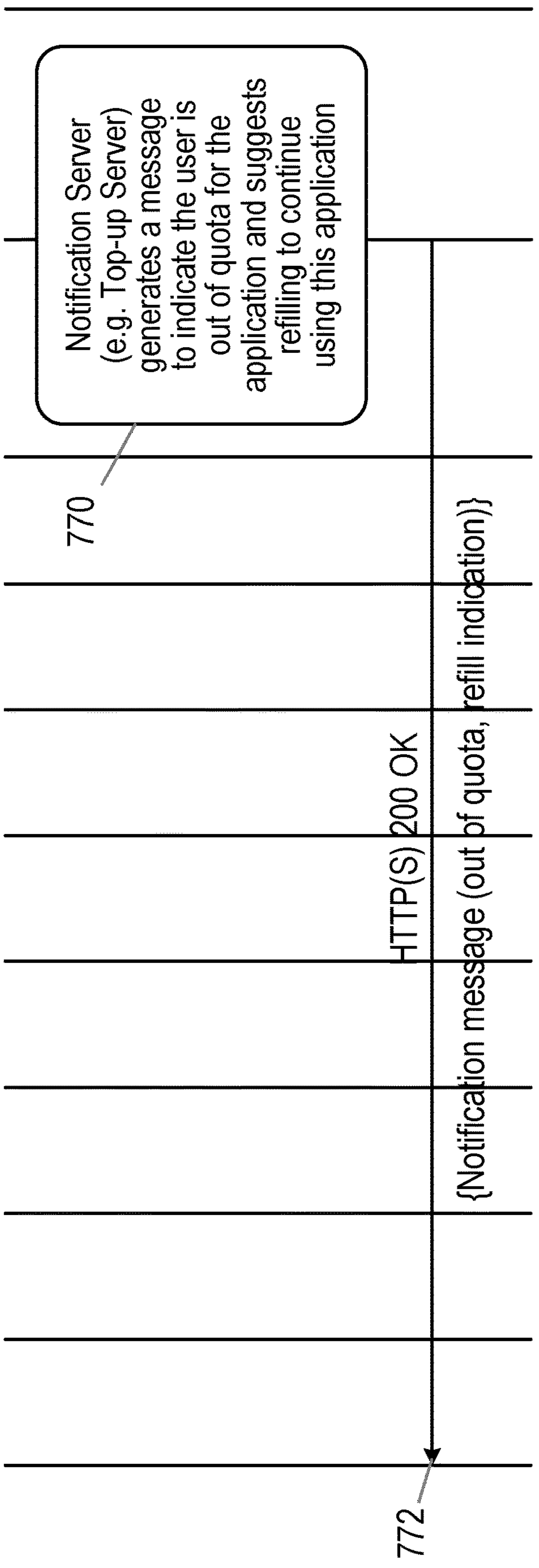
Figure 12 *(continued)*

METHODS FOR SUPPORTING USER NOTIFICATION SERVICES FOR EVENTS IN A NETWORK

CROSS REFERENCE TO RELATED APPLICATIONS

This application is a 35 U.S.C. § 371 national stage application of PCT International Application No. PCT/EP2020/081653 filed on Nov. 10, 2020, which in turn claims foreign priority to European Patent Application No. 20382898.3, filed on Oct. 13, 2020, the disclosures and content of which are incorporated by reference herein in their entirety.

TECHNICAL FIELD

The disclosure relates to a methods for handling events in a network and network nodes configured to operate in accordance with those methods.

BACKGROUND

FIG. 1 illustrates a third generation partnership project (3GPP) network architecture for the fifth generation (5G) of mobile network technology.

The 5G network architecture of FIG. 1 comprises a network slice selection function (NSSF) 612, a network exposure function (NEF) 20, a network repository function (NRF) 30, a policy control function (PCF) 50, a unified data management (UDM) 614, and an application function (AF) 10, each having a reference point, namely Nnssf, Nnef, Nnrf, Npcf, Nudm, and Naf respectively. Herein, a reference point may also be referred to as an interface. The 5G network architecture of FIG. 1 also comprises an authentication server function (AUSF) 616, an access and mobility management function (AMF) 602, and a session management function (SMF) 604, each having a reference point, namely Nausf, Namf, and Nsmf respectively.

The 5G network architecture of FIG. 1 further comprises at least one user equipment (UE) 60, an access network (AN) such as a radio access network (RAN) 618, a user plane function (UPF) 606, and a data network (DN) 620. There is a reference point N1 between the AMF 602 and the at least one UE 60, a reference point N2 between the AMF 602 and the (R)AN 618, a reference point N3 between the (R)AN 618 and the UPF 606, a reference point N4 between the SMF 604 and the UPF 606, a reference point N6 between the UPF 606 and the DN 620.

The AF 10 interacts with the 3GPP core network through the NEF 20. The NEF 20 supports different functionality. The NEF 20 acts as an entry point for external AF 10 into network of the operator. The PCF 50 supports a unified policy framework to govern the network behaviour. The NRF 30 supports registration and discovery procedures. The SMF 604 supports different functionality, e.g. session establishment, modify and release, and policy related functionalities like termination of interfaces towards policy control functions, charging data collection, support of charging interfaces and control and coordination of charging data collection at the UPF 606. The SMF 604 receives policy and charging control (PCC) rules from the PCF 50 and configures the UPF 606 accordingly through the N4 reference point. This can be referred to as the packet forwarding control protocol (PFCP).

In more detail, the SMF 604 controls the packet processing in the UPF 606 by establishing, modifying or deleting PFCP sessions and by provisioning (i.e. adding, modifying or deleting) packet detection rules (PDRs), forwarding action rules (FARs), quality of service enforcement rules (QERs) and/or usage reporting rules (URRs) per PFCP session, whereby a PFCP session may correspond to an individual protocol data unit (PDU) session or a standalone PFCP session not tied to any PDU session. Each PDR contains a packet data information (PDI) specifying the traffic filters or signatures against which incoming packets are matched. Each PDR is associated to the following rules providing the set of instructions to apply to packets matching the PDI:

- one FAR, which contains instructions related to the processing of the packets, specifically forward, redirect, duplicate, drop or buffer the packet with or without notifying the CP function about the arrival of a DL packet;
- zero, one or more QERs, which contains instructions related to the QoS enforcement of the traffic; and/or
- zero, one or more URRs, which contains instructions related to traffic measurement and reporting.

The user plane function (UPF) supports handling of user plane traffic based on the rules received from SMF. The user plane function (UPF) also supports handling of user plane traffic based on the rules received from SMF packet inspection (through PDRs) and different enforcement actions, e.g. traffic steering, quality of service (QoS), charging or reporting (e.g. through FARs, QERs, URRs, etc).

Traffic encryption is growing significantly in mobile networks and at the same time, the encryption mechanisms are growing in complexity. In particular, most applications today are not based on hypertext transfer protocol (HTTP) cleartext, but instead they are based on hypertext transfer protocol secure (HTTPS), e.g. using transport layer security (TLS). The TLS protocol specifies an extension known as server name indication (SNI). It is common for content servers to host multiple origins behind a single internet protocol (IP) address. In order to route application flows to the correct server without having to decrypt the entire flow, the SNI extension was introduced. The SNI extension is sent by the client in the Client Hello message and contains a clear text string of the domain name of the server to which that the client is attempting to connect. Since the SNI field is sent in clear text, it is commonly used by on-path network elements in order to classify flows. It has been proposed to encrypt the SNI extension.

Additionally, a significant part of the traffic in mobile networks is based on quick user datagram protocol internet connection (QUIC) transport, which has an encryption level higher than TLS. QUIC is a user datagram protocol (UDP) based, stream-multiplexing, encrypted transport protocol. QUIC is basically a UDP based replacement for TCP. QUIC is now under standardization at IETF and relies on TLS 1.3, so QUIC based applications will also have the Server Name Indication (SNI) extension encrypted. In the future, it is foreseen that most apps will be based on QUIC transport.

Domain name security (DNS) is one of the fundamental building blocks of the Internet. It is used any time a website is visited, an email is sent, an instant messaging (IM) conversation happens, or whenever any other actions occur online. When a user opens an application, DNS protocol is used to retrieve the server IP address/es for the target application domain. DNS protocol today is usually unencrypted (e.g. DNS over UDP/TCP), but there are proposals for DNS encryption to prevent middleboxes to detect DNS traffic. There different proposals include domain name system security extensions (DNSSEC), DNS over HTTP/2

(DOH), DNSCrypt, Quad9, etc. It is foreseen that in the 5G timeframe (2020-2030 decade) most DNS traffic will be encrypted.

There are various disadvantages associated with the above-described networks. In particular, network operators today apply different traffic management actions, which include user notification. This is supported in the UPF 606 as traffic redirection (e.g. HTTP based redirection) to notify a user of an event in the network, e.g. when the user's quota has expired (e.g. on a per application basis), the user is entering roaming that might be subject to extra charging, or any other events. However, it is currently not possible for the UPF 606 to apply redirection for HTTPS traffic (HTTP/HTTP2 over TLS). The same happens for QUIC based applications (HTTP3 over QUIC). Moreover, most applications today are encrypted (HTTPS/TLS or QUIC) and, for those, traffic redirection in the UPF 606 is not possible. In addition, DNS traffic is encrypted (e.g. DoH) so it is not even possible to trigger redirection based on DNS inspection at the UPF 606. Similar disadvantages are associated with other generations of mobile network technology, such as the fourth generation (4G) of mobile network technology.

SUMMARY

It is thus an object of the disclosure to obviate or eliminate at least some of the above-described disadvantages associated with existing techniques.

Therefore, according to an aspect of the disclosure, there is provided a method for handling events in a network. The method is performed by a first network node. The first network node is external to the network and is configured to communicate with the network via a second network node that is internal to the network. The method comprises initiating transmission of a first request towards the second network node. The first request comprises information indicative that the first network node supports a user notification service that notifies one or more user equipments (UEs) of events in the network.

In some embodiments, the method may comprise receiving a response to the first request, wherein the response to the first request may comprise information indicative that the second network node received the first request.

In some embodiments, the first request may comprise an identifier that identifies the first network node, one or more identifiers that each identify an application to which the first network node is capable of providing the user notification service, information indicative of one or more actions supported by the user notification service to notify one or more UEs of events in the network, one or more identifiers that each identify a UE to which the first network node is capable of initiating one or more actions to notify the UE of events in the network, one or more identifiers that each identify a group of UEs to which the first network node is capable of initiating one or more actions to notify the group of UEs of events in the network, and/or information indicative that an operator of the network is to trigger the user notification service.

In some embodiments, the method may comprise initiating transmission of a second request towards a third network node operable to support registration procedures in the network, wherein the second request may be to register the user notification service at the third network node.

In some embodiments, transmission of the second request may be initiated if the first network node is trusted by the third network node.

In some embodiments, the method may comprise, in response to receiving a first message, wherein the first message is a request for a fifth network node operable to provide policies in the network to subscribe to the user notification service, initiating execution of the user notification service to notify one or more UEs of one or more events in the network.

In some embodiments, the first message may comprise information indicative that a service to which the fifth network node requests to subscribe is the user notification service, one or more identifiers that each identify an application to which the user notification service is to be provided, one or more identifiers that each identify a UE that is to be notified of events in the network, one or more identifiers that each identify a group of UEs that is to be notified of events in the network, and/or the policy comprising one or more criteria for execution of the user notification service.

In some embodiments, the one or more criteria may comprise a criteria for the first network node to transmit a message towards the one or more UEs to notify the one or more UEs of events in the network, a criteria for the first network node to transmit a message towards a server requesting that the server notifies the one or more UEs of events in the network, a criteria that the one or more UEs are notified of events in the network continuously or only once for each event, and/or a criteria that traffic to and/or from the one or more UEs is blocked or allowed while the one or more UEs are notified of events in the network.

In some embodiments, the user notification service may be initiated via an application server and/or an application client, wherein the application server and/or an application client executes the user notification service.

According to another aspect of the disclosure, there is provided a first network node configured to operate in accordance with the method described earlier in respect of the first network node.

In some embodiments the first network node may comprise processing circuitry configured to operate in accordance with the method described earlier in respect of the first network node.

In some embodiments the first network node may comprise at least one memory for storing instructions which, when executed by the processing circuitry, cause the first network node to operate in accordance with the method described earlier in respect of the first network node.

According to another aspect of the disclosure, there is provided another method for handling events in a network. The method is performed by a second network node that is internal to the network and via which a first network node that is external to the network is configured to communicate with the network. The method comprises, in response to receiving a first request, wherein transmission of the first request is initiated by the first network node, initiating transmission of a second request towards a third network node operable to support registration procedures in the network and/or initiating transmission of a third request towards a fourth network node operable to store one or more policies for the network. The first request comprises information indicative that the first network node supports a user notification service that notifies one or more user equipments (UEs) of events in the network. The second request is to register the user notification service at the third network node. The third request is for the fourth network node to store a policy comprising one or more criteria for execution of the user notification service.

In some embodiments, the one or more criteria may comprise a criteria for the first network node to transmit a message towards the one or more UEs to notify the one or more UEs of events in the network, a criteria for the first network node to transmit a message towards a server requesting that the server notifies the one or more UEs of events in the network, a criteria that the one or more UEs are notified of events in the network continuously or only once for each event, and/or a criteria that traffic to and/or from the one or more UEs is blocked or allowed while the one or more UEs are notified of events in the network.

In some embodiments, transmission of the second request may be initiated if the first network node is untrusted by the third network node.

In some embodiments, the second request may comprise information indicative of a node type for the second network node, information indicative that a service to be registered is the user notification service, and/or one or more identifiers that each identify an application to which the first network node is capable of providing the user notification service.

In some embodiments, the third request may comprise information indicative that a service to be registered is the user notification service, one or more identifiers that each identify an application to which the first network node is capable of providing the user notification service, one or more identifiers that each identify a UE to which the first network node is capable of initiating one or more actions to notify the UE of events in the network, and/or one or more identifiers that each identify a group of UEs to which the first network node is capable of initiating one or more actions to notify the group of UEs of events in the network.

In some embodiments, the first request may comprise an identifier that identifies the first network node, one or more identifiers that each identify an application to which the first network node is capable of providing the user notification service, information indicative of one or more actions supported by the user notification service to notify one or more UEs of events in the network, one or more identifiers that each identify a UE to which the first network node is capable of initiating one or more actions to notify the UE of events in the network, one or more identifiers that each identify a group of UEs to which the first network node is capable of initiating one or more actions to notify the group of UEs of events in the network, and/or information indicative that an operator of the network is to trigger the user notification service.

In some embodiments, the method may comprise initiating transmission of a response to the first request towards the first network node, wherein the response to the first request comprises information indicative that the second network node received the first request.

In some embodiments, the method may comprise, in response to receiving a first message, wherein the first message is a request for a fifth network node operable to provide policies in the network to subscribe to the user notification service, initiating transmission of the first message towards the first network node.

In some embodiments, the first message may comprise information indicative that a service the fifth network node requests to subscribe is the user notification service, one or more identifiers that each identify an application to which the user notification service is to be provided, one or more identifiers that each identify a UE that is to be notified of events in the network, one or more identifiers that each identify a group of UEs that is to be notified of events in the network, and/or the policy comprising one or more criteria for execution of the user notification service.

In some embodiments, the one or more criteria may comprise a criteria for the first network node to transmit a message towards the one or more UEs to notify the one or more UEs of events in the network, a criteria for the first network node to transmit a message towards a server requesting that the server notifies the one or more UEs of events in the network, a criteria that the one or more UEs are notified of events in the network continuously or only once for each event, and/or a criteria that traffic to and/or from the one or more UEs is blocked or allowed while the one or more UEs are notified of events in the network.

According to another aspect of the disclosure, there is provided a second network node (20) configured to operate in accordance with the method described earlier in respect of the second network node.

In some embodiments, the second network node may comprise processing circuitry configured to operate in accordance with the method described earlier in respect of the second network node.

In some embodiments, the second network node may comprise at least one memory for storing instructions which, when executed by the processing circuitry, cause the second network node to operate in accordance with the method described earlier in respect of the second network node.

According to another aspect of the disclosure, there is provided another method for handling events in a network. The method is performed by a third network node operable to support registration procedures in the network. The method comprises, in response to receiving a second request to register, at the third network node, a user notification service that notifies one or more user equipments (UEs) of events in the network, registering the user notification service at the third network node. Transmission of the second request is initiated by a second network node via which a first network node that supports the user notification service is configured to communicate with the network.

In some embodiments, the second request may comprise information indicative of a node type for the second network node, information indicative that a service to be registered is the user notification service, and/or one or more identifiers that each identify an application to which the first network node is capable of providing the user notification service.

In some embodiments, the user notification service may be registered for one or more applications to which the first network node is capable of providing the user notification service.

In some embodiments, the method may comprise initiating transmission of a response to the second request towards the first network node and/or the second network node, wherein the response to the second request may comprise information indicative that the third network node received the second request.

In some embodiments, the method may comprise, in response to receiving a second message, wherein the second message is a request for information indicative of the second network node and transmission of the second message is initiated by a fifth network node operable to provide policies in the network, initiating transmission of information indicative of the second network node.

In some embodiments, the second message may comprise information indicative of a node type for the second network node, information indicative that a service to be registered is the user notification service, and/or one or more identifiers that each identify an application to which the first network node is capable of providing the user notification service.

According to another aspect of the disclosure, there is provided a third network node configured to operate in accordance with the method described earlier in respect of the third network node.

In some embodiments, the third network node may comprise processing circuitry configured to operate in accordance with the method described earlier in respect of the third network node.

In some embodiments, the third network node may comprise at least one memory for storing instructions which, when executed by the processing circuitry, cause the third network node to operate in accordance with the method described earlier in respect of the third network node.

According to another aspect of the disclosure, there is provided another method for handling events in a network. The method is performed by a fourth network node operable to store one or more policies for the network. The method comprises, in response to receiving a third request for the fourth network node to store a policy comprising one or more criteria for execution of a user notification service that notifies one or more user equipments (UEs) of events in the network, storing the policy for the user notification service. The method comprises, in response to receiving a fourth request for a policy to apply to a communication session in the network that the at least one of the one or more UEs requests to establish, wherein transmission of the fourth request is initiated by a fifth network node operable to provide policies in the network, initiating transmission of a response to the fourth request towards the fifth network node. The response to the fourth request comprises the policy for the user notification service.

In some embodiments, the one or more criteria may comprise a criteria for a first network node, that supports the user notification service, to transmit a message towards the one or more UEs to notify the one or more UEs of events in the network, a criteria for the first network node to transmit a message towards a server requesting that the server notifies the one or more UEs of events in the network, a criteria that the one or more UEs are notified of events in the network continuously or only once for each event, and/or a criteria that traffic to and/or from the one or more UEs is blocked or allowed while the one or more UEs are notified of events in the network.

In some embodiments, the third request may comprise information indicative that a service to be registered is the user notification service, one or more identifiers that each identify an application to which a first network node is capable of providing the user notification service, one or more identifiers that each identify a UE to which the first network node is capable of initiating one or more actions to notify the UE of events in the network, and/or one or more identifiers that each identify a group of UEs to which the first network node is capable of initiating one or more actions to notify the group of UEs of events in the network.

In some embodiments, the policy for the user notification service may be for one or more applications.

According to another aspect of the disclosure, there is provided a fourth network node configured to operate in accordance with the method described earlier in respect of the fourth network node.

In some embodiments, the fourth network node comprise processing circuitry configured to operate in accordance with the method described earlier in respect of the fourth network node.

In some embodiments, the fourth network node may comprise at least one memory for storing instructions which, when executed by the processing circuitry, cause the fourth network node to operate in accordance with the method described earlier in respect of the fourth network node.

According to another aspect of the disclosure, there is provided another method for handling events in a network. The method is performed by a fifth network node operable to provide policies in the network. The method comprises, in response to a UE requesting establishment of a communication session in the network, initiating transmission of a fourth request towards a fourth network node operable to store one or more policies for the network. The fourth request is for a policy to apply to the communication session. The method comprises receiving a response to the fourth request. The response to the fourth request comprises a policy and the policy comprises one or more criteria for execution of a user notification service that notifies one or more user equipments (UEs) of events in the network.

In some embodiments, the one or more criteria may comprise a criteria for a first network node, that supports the user notification service, to transmit a message towards the one or more UEs to notify the one or more UEs of events in the network, a criteria for the first network node to transmit a message towards a server requesting that the server notifies the one or more UEs of events in the network, a criteria that the one or more UEs are notified of events in the network continuously or only once for each event, and/or a criteria that traffic to and/or from the one or more UEs is blocked or allowed while the one or more UEs are notified of events in the network.

In some embodiments, the method may comprise, in response to detection of one or more events in the network, triggering execution of the user notification service in accordance with the one or more criteria of the policy.

In some embodiments, the one or more events in the network may be associated with one or more applications.

In some embodiments, the method may comprise initiating transmission of a second message towards a third network node operable to support registration procedures in the network, wherein the second message may be a request for information indicative of a second network node via which a first network node that supports the user notification service communicates with the network.

In some embodiments, the first network node may be capable of providing the user notification service to the one or more applications.

In some embodiments, the second message may comprise information indicative of a node type for the second network node, information indicative that a service to be registered is the user notification service, and/or one or more identifiers that each identify an application to which the first network node is capable of providing the user notification service.

In some embodiments, the method may comprise, in response to the second message, receiving information indicative of the second network node.

In some embodiments, the method may comprise initiating transmission of a first message towards the second network node, wherein the first message may be a request for the fifth network node to subscribe to user notification service.

In some embodiments, the first message may comprise information indicative that a service the fifth network node requests to subscribe is the user notification service, one or more identifiers that each identify an application to which the user notification service is to be provided, one or more identifiers that each identify a UE that is to be notified of events in the network, one or more identifiers that each identify a group of UEs that is to be notified of events in the network, and/or the policy comprising one or more criteria for execution of the user notification service.

According to another aspect of the disclosure, there is provided a fifth network node configured to operate in accordance with the method described earlier in respect of the fifth network node.

In some embodiments, the fifth network node may comprise processing circuitry configured to operate in accordance with the method described earlier in respect of the fifth network node.

In some embodiments, the fifth network node may comprise at least one memory for storing instructions which, when executed by the processing circuitry, cause the fifth network node to operate in accordance with the method described earlier in respect of the fifth network node.

According to another aspect of the disclosure, there is provided a method performed by a system. The method comprises the method as described above in respect of the first network node, the method as described above in respect of the second network node, the method as described above in respect of the third network node, the method as described above in respect of the fourth network node, and/or the method as described above in respect of the fifth network node.

According to another aspect of the disclosure, there is provided a system comprising at least one first network node as described earlier, at least one second network node as described earlier, at least one third network node as described earlier, at least one fourth network node as described earlier, and/or at least one fifth network node as described earlier.

According to another aspect of the disclosure, there is provided a computer program comprising instructions which, when executed by processing circuitry, cause the processing circuitry to perform the method described earlier. The computer program thus provides the advantages described earlier.

According to another aspect of the disclosure, there is provided a computer program product, embodied on a non-transitory machine-readable medium, comprising instructions which are executable by processing circuitry to cause the processing circuitry to perform the method described earlier. The computer program product thus provides the advantages described earlier.

Therefore, an advantageous technique for handling events in a network is provided.

BRIEF DESCRIPTION OF THE DRAWINGS

For a better understanding of the techniques, and to show how they may be put into effect, reference will now be made, by way of example, to the accompanying drawings, in which.

DETAILED DESCRIPTION

As mentioned earlier, an advantageous technique for handling events in a network is described herein. The network referred to herein can be a fourth generation (4G) network, a fifth generation (5G) network, or any other generation network. The network referred to herein can be a telecommunications network, such as a cellular or mobile network. The network referred to herein may, for example, be a radio access network (RAN), or any other type of telecommunications network. The network referred to herein can comprise one or more network nodes. In some embodiments, the network referred to herein can be a virtualized network (e.g. comprising virtual network nodes), an at least partially virtualized network (e.g. comprising at least some virtual network nodes and at least some hardware network nodes), or a hardware network (e.g. comprising hardware network nodes).

Figure 2:
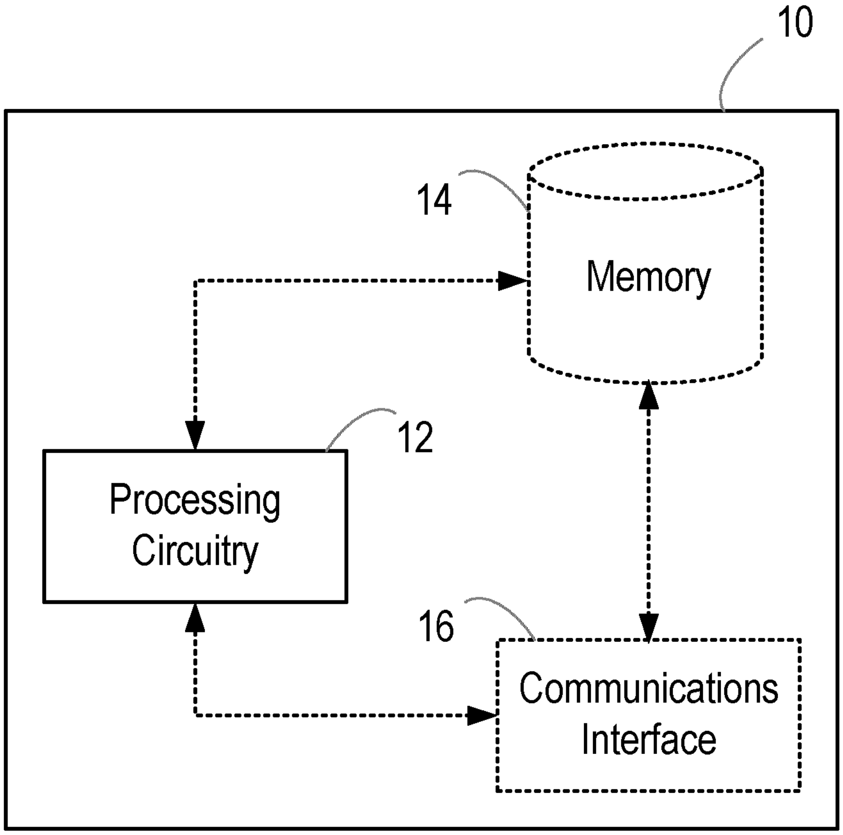
FIG. 2 is a block diagram illustrating a first network node according to an embodiment.

FIG. 2 illustrates a first network node 10 in accordance with an embodiment. The first network node 10 is for handling events in a network. The first network node 10 may, for example, be a physical machine (e.g. a server) or a virtual machine (VM). In a 5G embodiment, the first network node 10 can be an application function (AF) node 10. In a 4G embodiment, the first network node 10 can be a service capability server (SCS) or an application server (AS). The first network node 10 is external to the network and is configured to communicate with the network via a second network node that is internal to the network.

As illustrated in FIG. 2, the first network node 10 comprises processing circuitry (or logic) 12. The processing circuitry 12 controls the operation of the first network node 10 and can implement the method described herein in respect of the first network node 10. The processing circuitry 12 can be configured or programmed to control the first network node 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first network node 10. In some embodiments, the processing circuitry 12 can be configured to run software to perform the method described herein in respect of the first network node 10. The software may be containerised according to some embodiments. Thus, in some embodiments, the processing circuitry 12 may be configured to run a container to perform the method described herein in respect of the first network node 10.

Briefly, the processing circuitry 12 of the first network node 10 is configured to initiate transmission of a first request towards the second network node. The first request comprises information indicative that the first network node 10 supports a user notification service that notifies one or more user equipments (UEs) of events in the network.

As illustrated in FIG. 2, in some embodiments, the first network node 10 may optionally comprise a memory 14. The memory 14 of the first network node 10 can comprise a volatile memory or a non-volatile memory. In some embodiments, the memory 14 of the first network node 10 may comprise a non-transitory media. Examples of the memory 14 of the first network node 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first network node 10 can be connected to the memory 14 of the first network node 10. In some embodiments, the memory 14 of the first network node 10 may be for storing program code or instructions which, when executed by the processing circuitry 12 of the first network node 10, cause the first network node 10 to operate in the manner described herein in respect of the first network node 10. For example, in some embodiments, the memory 14 of the first network node 10 may be configured to store program code or instructions that can be executed by the processing circuitry 12 of the first network node 10 to cause the first network node 10 to operate in accordance with the method described herein in respect of the first network node 10. Alternatively or in addition, the memory 14 of the first network node 10 can be configured to store any information, data, messages, requests, responses, indications, notifications, signals, or similar, that are described herein. The processing circuitry 12 of the first network node 10 may be configured to control the memory 14 of the first network node to store information, data, messages, requests, responses, indications, notifications, signals, or similar, that are described herein.

In some embodiments, as illustrated in FIG. 2, the first network node 10 may optionally comprise a communications interface 16. The communications interface 16 of the first network node 10 can be connected to the processing circuitry 12 of the first network node and/or the memory 14 of first network node 10. The communications interface 16 of the first network node 10 may be operable to allow the processing circuitry 12 of the first network node 10 to communicate with the memory 14 of the first network node 10 and/or vice versa. Similarly, the communications interface 16 of the first network node 10 may be operable to allow the processing circuitry 12 of the first network node 10 to communicate with any other nodes referred to herein. The communications interface 16 of the first network node 10 can be configured to transmit and/or receive information, data, messages, requests, responses, indications, notifications, signals, or similar, that are described herein. In some embodiments, the processing circuitry 12 of the first network node 10 may be configured to control the communications interface 16 of the first network node 10 to transmit and/or receive information, data, messages, requests, responses, indications, notifications, signals, or similar, that are described herein.

Although the first network node 10 is illustrated in FIG. 2 as comprising a single memory 14, it will be appreciated that the first network node 10 may comprise at least one memory (i.e. a single memory or a plurality of memories) 14 that operate in the manner described herein. Similarly, although the first network node 10 is illustrated in FIG. 2 as comprising a single communications interface 16, it will be appreciated that the first network node 10 may comprise at least one communications interface (i.e. a single communications interface or a plurality of communications interface) 16 that operate in the manner described herein. It will also be appreciated that FIG. 2 only shows the components required to illustrate an embodiment of the first network node 10 and, in practical implementations, the first network node 10 may comprise additional or alternative components to those shown.

Figure 3:
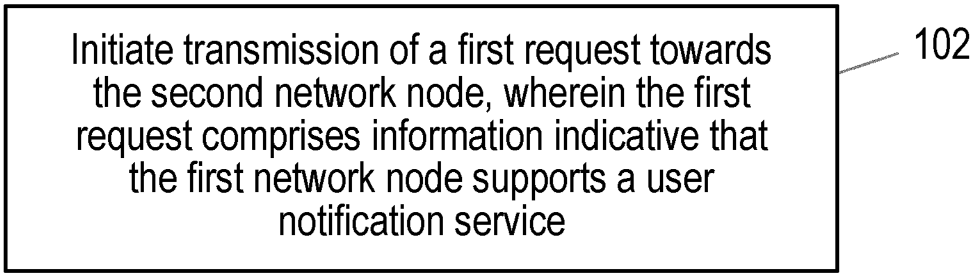
FIG. 3 is a flowchart illustrating a method performed by a first network node according to an embodiment.

FIG. 3 is a flowchart illustrating a method performed by a first network node 10 in accordance with an embodiment. The method is for handling events in a network. The first network node 10 described earlier with reference to FIG. 2 can be configured to operate in accordance with the method of FIG. 3. The method can be performed by or under the control of the processing circuitry 12 of the first network node 10 according to some embodiments.

With reference to FIG. 3, as illustrated at block 102, transmission of a first request is initiated towards the second network node. Herein, the term "initiate" can mean, for example, cause or establish. Thus, the processing circuitry 12 of the first network node can be configured to itself transmit the first request (e.g. via a communications interface 16 of the first network node 10) or can be configured to cause another network node to transmit the first request. As mentioned earlier, the first request comprises information indicative that the first network node 10 supports a user notification service that notifies one or more UEs of events in the network.

Figure 4:
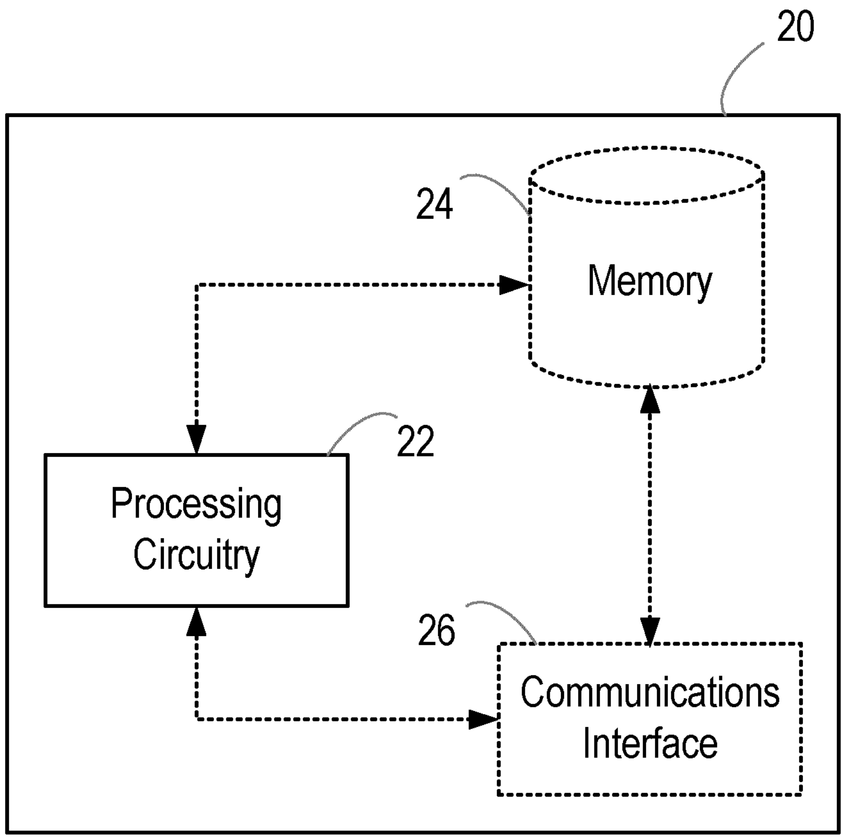
FIG. 4 is a block diagram illustrating a second network node according to an embodiment.

FIG. 4 illustrates a second network node 20 in accordance with an embodiment. The second network node 20 is for handling events in a network. The second network node may, for example, be a physical machine (e.g. a server) or a virtual machine (VM). In some embodiments, the second network node 20 can be a second network node of the network. In a 4G embodiment, the second network node 20 can be a service capability exposure function (SCEF) node. In a 5G embodiment, the second network node 20 can be a network exposure function (NEF) node. The second network node 20 is internal to the network and it is via the second network node 20 that the first network node 10 (which is external to the network) is configured to communicate with the network.

As illustrated in FIG. 4, the second network node 20 comprises processing circuitry (or logic) 22. The processing circuitry 22 controls the operation of the second network node and can implement the method described herein in respect of the second network node 20. The processing circuitry 22 can be configured or programmed to control the second network node 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the second network node 20. In some embodiments, the processing circuitry 22 can be configured to run software to perform the method described herein in respect of the second network node 20. The software may be containerised according to some embodiments. Thus, in some embodiments, the processing circuitry 22 may be configured to run a container to perform the method described herein in respect of the second network node 20.

Briefly, the processing circuitry 22 of the second network node 20 is configured to, in response to receiving a first request, where transmission of the first request is initiated by the first network node 10, initiate transmission of a second request towards a third network node operable to support registration procedures in the network and/or initiate transmission of a third request towards a fourth network node operable to store one or more policies for the network. The first request comprises information indicative that the first network node 10 supports a user notification service that notifies one or more UEs of events in the network. The second request is to register the user notification service at the third network node. The third request is for the fourth network node to store a policy comprising one or more criteria for execution of the user notification service.

As illustrated in FIG. 4, in some embodiments, the second network node 20 may optionally comprise a memory 24. The memory 24 of the second network node 20 can comprise a volatile memory or a non-volatile memory. In some embodiments, the memory 24 of the second network node 20 may comprise a non-transitory media. Examples of the memory 24 of the second network node 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the second network node 20 can be connected to the memory 24 of the second network node 20. In some embodiments, the memory 24 of the second network node 20 may be for storing program code or instructions which, when executed by the processing circuitry 22 of the second network node 20, cause the second network node 20 to operate in the manner described herein in respect of the second network node 20. For example, in some embodiments, the memory 24 of the second network node 20 may be configured to store program code or instructions that can be executed by the processing circuitry 22 of the second network node 20 to cause the second network node 20 to operate in accordance with the method described herein in respect of the second network node 20. Alternatively or in addition, the memory 24 of the second network node 20 can be configured to store any information, data, messages, requests, responses, indications, notifications, signals, or similar, that are described herein. The processing circuitry 22 of the second network node 20 may be configured to control the memory 24 of the second network node 20 to store information, data, messages, requests, responses, indications, notifications, signals, or similar, that are described herein.

In some embodiments, as illustrated in FIG. 4, the second network node 20 may optionally comprise a communications interface 26. The communications interface 26 of the second network node 20 can be connected to the processing circuitry 22 of the second network node 20 and/or the memory 24 of second network node 20. The communications interface 26 of the second network node 20 may be operable to allow the processing circuitry 22 of the second network node 20 to communicate with the memory 24 of the second network node 20 and/or vice versa. Similarly, the communications interface 26 of the second network node 20 may be operable to allow the processing circuitry 22 of the second network node 20 to communicate with any other nodes referred to herein. The communications interface 26 of the second network node can be configured to transmit and/or receive information, data, messages, requests, responses, indications, notifications, signals, or similar, that are described herein. In some embodiments, the processing circuitry 22 of the second network node 20 may be configured to control the communications interface 26 of the second network node 20 to transmit and/or receive information, data, messages, requests, responses, indications, notifications, signals, or similar, that are described herein.

Although the second network node 20 is illustrated in FIG. 4 as comprising a single memory 24, it will be appreciated that the second network node 20 may comprise at least one memory (i.e. a single memory or a plurality of memories) 24 that operate in the manner described herein. Similarly, although the second network node 20 is illustrated in FIG. 4 as comprising a single communications interface 26, it will be appreciated that the second network node 20 may comprise at least one communications interface (i.e. a single communications interface or a plurality of communications interface) 26 that operate in the manner described herein. It will also be appreciated that FIG. 4 only shows the components required to illustrate an embodiment of the second network node and, in practical implementations, the second network node 20 may comprise additional or alternative components to those shown.

Figure 5:
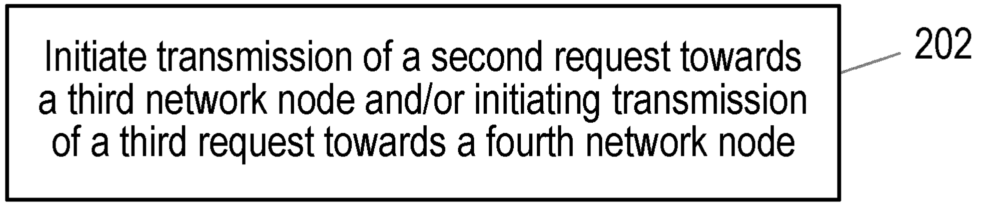
FIG. 5 is a flowchart illustrating a method performed by a second network node according to an embodiment.

FIG. 5 is a flowchart illustrating a method performed by a second network node 20 in accordance with an embodiment. The method is for handling events in a network. The second network node 20 described earlier with reference to FIG. 4 can be configured to operate in accordance with the method of FIG. 5. The method can be performed by or under the control of the processing circuitry 22 of the second network node 20 according to some embodiments.

With reference to FIG. 5, as illustrated at block 202, in response to receiving a first request, where transmission of the first request is initiated by the first network node 10, transmission of a second request is initiated towards a third network node operable to support registration procedures in the network and/or transmission of a third request is initiated towards a fourth network node operable to store one or more policies for the network. More specifically, the processing circuitry 22 of the second network node 20 can be configured to initiate transmission of (e.g. itself transmit or cause another node to transmit, such as via the communications interface 26 of the second network node 20) the second request and/or the third request according to some embodiments. The first request comprises information indicative that the first network node 10 supports a user notification service that notifies one or more UEs of events in the network. The second request is to register the user notification service at the third network node. The third request is for the fourth network node to store a policy comprising one or more criteria for execution of the user notification service.

Figure 6:
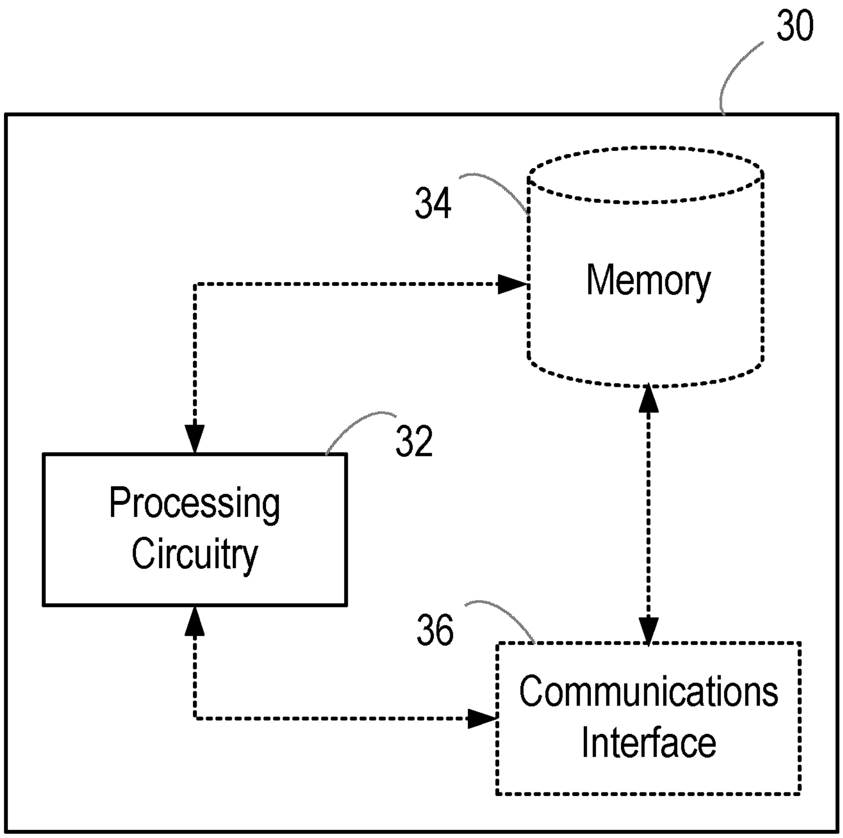
FIG. 6 is a block diagram illustrating a third network node according to an embodiment.

FIG. 6 illustrates a third network node 30 in accordance with an embodiment. The third network node 30 is for handling events in a network. The third network node 30 may, for example, be a physical machine (e.g. a server) or a virtual machine (VM). In some embodiments, the third network node 30 can be a third network node of the network. In a 4G embodiment, the third network node 30 can be a domain name system (DNS) server. In a 5G embodiment, the third network node 30 can be a network repository function (NRF) node. The third network node 30 is operable to support registration procedures in the network.

As illustrated in FIG. 6, the third network node 30 comprises processing circuitry (or logic) 32. The processing circuitry 32 controls the operation of the third network node 30 and can implement the method described herein in respect of the third network node 30. The processing circuitry 32 can be configured or programmed to control the third network node 30 in the manner described herein. The processing circuitry 32 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the third network node 30. In some embodiments, the processing circuitry 32 can be configured to run software to perform the method described herein in respect of the third network node 30. The software may be containerised according to some embodiments. Thus, in some embodiments, the processing circuitry 32 may be configured to run a container to perform the method described herein in respect of the third network node 30.

Briefly, the processing circuitry 32 of the third network node 30 is configured to, in response to receiving a second request to register, at the third network node 30, a user notification service that notifies one or more UEs of events in the network, registering the user notification service at the third network node 30. Transmission of the second request is initiated by the second network node 20 via which the first network node 10 that supports the user notification service is configured to communicate with the network.

As illustrated in FIG. 6, in some embodiments, the third network node 30 may optionally comprise a memory 34. The memory 34 of the third network node 30 can comprise a volatile memory or a non-volatile memory. In some embodiments, the memory 34 of the third network node 30 may comprise a non-transitory media. Examples of the memory 34 of the third network node 30 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 32 of the third network node 30 can be connected to the memory 34 of the third network node 30. In some embodiments, the memory 34 of the third network node 30 may be for storing program code or instructions which, when executed by the processing circuitry 32 of the third network node 30, cause the third network node to operate in the manner described herein in respect of the third network node 30. For example, in some embodiments, the memory 34 of the third network node 30 may be configured to store program code or instructions that can be executed by the processing circuitry 32 of the third network node 30 to cause the third network node 30 to operate in accordance with the method described herein in respect of the third network node 30. Alternatively or in addition, the memory 34 of the third network node 30 can be configured to store any information, data, messages, requests, responses, indications, notifications, signals, or similar, that are described herein. The processing circuitry 32 of the third network node 30 may be configured to control the memory 34 of the third network node 30 to store information, data, messages, requests, responses, indications, notifications, signals, or similar, that are described herein.

In some embodiments, as illustrated in FIG. 6, the third network node 30 may optionally comprise a communications interface 36. The communications interface 36 of the third network node 30 can be connected to the processing circuitry 32 of the third network node 30 and/or the memory 34 of third network node 30. The communications interface 36 of the third network node 30 may be operable to allow the processing circuitry 32 of the third network node 30 to communicate with the memory 34 of the third network node and/or vice versa. Similarly, the communications interface 36 of the third network node 30 may be operable to allow the processing circuitry 32 of the third network node to communicate with any other nodes referred to herein. The communications interface 36 of the third network node 30 can be configured to transmit and/or receive information, data, messages, requests, responses, indications, notifications, signals, or similar, that are described herein. In some embodiments, the processing circuitry 32 of the third network node 30 may be configured to control the communications interface 36 of the third network node 30 to transmit and/or receive information, data, messages, requests, responses, indications, notifications, signals, or similar, that are described herein.

Although the third network node 30 is illustrated in FIG. 6 as comprising a single memory 34, it will be appreciated that the third network node 30 may comprise at least one memory (i.e. a single memory or a plurality of memories) 34 that operate in the manner described herein. Similarly, although the third network node 30 is illustrated in FIG. 6 as comprising a single communications interface 36, it will be appreciated that the third network node 30 may comprise at least one communications interface (i.e. a single communications interface or a plurality of communications interface) 36 that operate in the manner described herein. It will also be appreciated that FIG. 6 only shows the components required to illustrate an embodiment of the third network node 30 and, in practical implementations, the third network node 30 may comprise additional or alternative components to those shown.

Figure 7:
FIG. 7 is a flowchart illustrating a method performed by a third network node according to an embodiment.

FIG. 7 is a flowchart illustrating a method performed by a third network node 30 in accordance with an embodiment. The method is for handling events in a network. The third network node 30 described earlier with reference to FIG. 6 can be configured to operate in accordance with the method of FIG. 7. The method can be performed by or under the control of the processing circuitry 32 of the third network node 30 according to some embodiments.

With reference to FIG. 7, as illustrated at block 302, in response to receiving a second request to register, at the third network node 30, a user notification service that notifies one or more UEs of events in the network, the user notification service is registered at the third network node 30. More specifically, the processing circuitry 32 of the third network node 30 can register the user notification service according to some embodiments. Transmission of the second request is initiated by the second network node 20 via which the first network node 10 that supports the user notification service is configured to communicate with the network.

Figure 8:
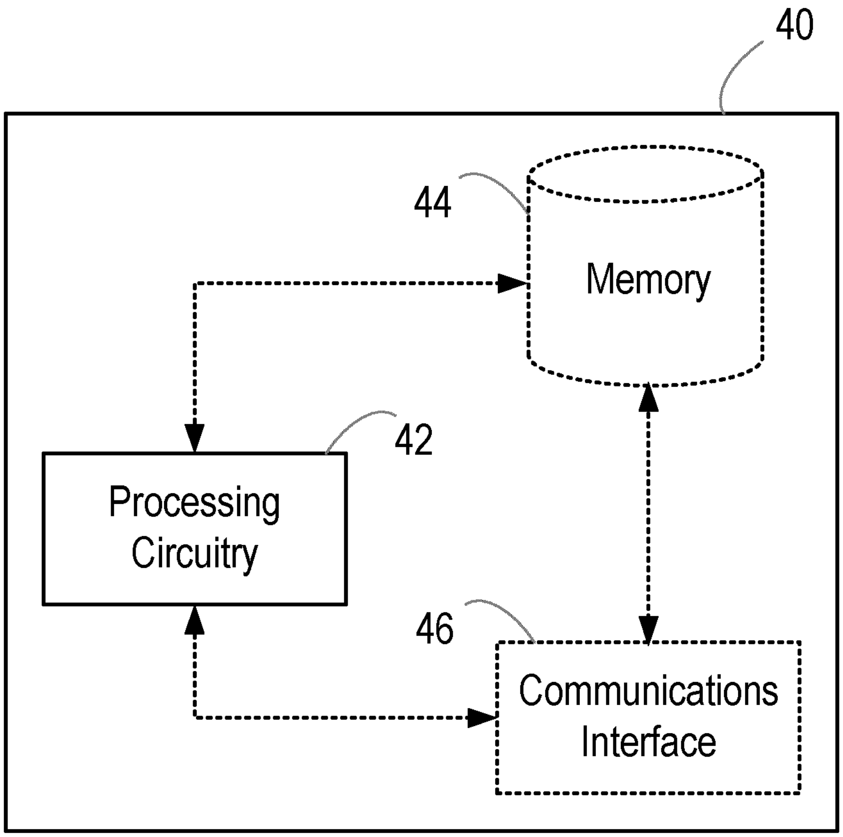
FIG. 8 is a block diagram illustrating a fourth network node according to an embodiment.

FIG. 8 illustrates a fourth network node 40 in accordance with an embodiment. The fourth network node 40 is for handling events in a network. The fourth network node 40 may, for example, be a physical machine (e.g. a server) or a virtual machine (VM). In some embodiments, the fourth network node 40 can be a fourth network node of the network. In a 4G embodiment, the fourth network node 40 can be a home subscriber server (HSS). In a 5G embodiment, the fourth network node 40 can be a unified data repository (UDR) node. The fourth network node 40 is operable to store one or more policies for the network.

As illustrated in FIG. 8, the fourth network node 40 comprises processing circuitry (or logic) 42. The processing circuitry 42 controls the operation of the fourth network node and can implement the method described herein in respect of the fourth network node 40. The processing circuitry 42 can be configured or programmed to control the fourth network node 40 in the manner described herein. The processing circuitry 42 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the fourth network node 40. In some embodiments, the processing circuitry 42 can be configured to run software to perform the method described herein in respect of the fourth network node 40. The software may be containerised according to some embodiments. Thus, in some embodiments, the processing circuitry 42 may be configured to run a container to perform the method described herein in respect of the fourth network node 40.

Briefly, the processing circuitry 42 of the fourth network node 40 is configured to, in response to receiving a third request for the fourth network node 40 to store a policy comprising one or more criteria for execution of a user notification service that notifies one or more UEs of events in the network, store the policy for the user notification service. The processing circuitry 42 of the fourth network node 40 is configured to, in response to receiving a fourth request for a policy to apply to a communication session in the network that the UE requests to establish, where transmission of the fourth request is initiated by a fifth network node operable to provide policies in the network, initiate transmission of a response to the fourth request towards the fifth network node. The response to the fourth request comprises the policy for the user notification service.

As illustrated in FIG. 8, in some embodiments, the fourth network node 40 may optionally comprise a memory 44. The memory 44 of the fourth network node 40 can comprise a volatile memory or a non-volatile memory. In some embodiments, the memory 44 of the fourth network node 40 may comprise a non-transitory media. Examples of the memory 44 of the fourth network node 40 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 42 of the fourth network node 40 can be connected to the memory 44 of the fourth network node 40. In some embodiments, the memory 44 of the fourth network node 40 may be for storing program code or instructions which, when executed by the processing circuitry 42 of the fourth network node 40, cause the fourth network node 40 to operate in the manner described herein in respect of the fourth network node 40. For example, in some embodiments, the memory 44 of the fourth network node 40 may be configured to store program code or instructions that can be executed by the processing circuitry 42 of the fourth network node 40 to cause the fourth network node 40 to operate in accordance with the method described herein in respect of the fourth network node 40. Alternatively or in addition, the memory 44 of the fourth network node 40 can be configured to store any information, data, messages, requests, responses, indications, notifications, signals, or similar, that are described herein. The processing circuitry 42 of the fourth network node 40 may be configured to control the memory 44 of the fourth network node 40 to store information, data, messages, requests, responses, indications, notifications, signals, or similar, that are described herein.

In some embodiments, as illustrated in FIG. 8, the fourth network node 40 may optionally comprise a communications interface 46. The communications interface 46 of the fourth network node 40 can be connected to the processing circuitry 42 of the fourth network node 40 and/or the memory 44 of fourth network node 40. The communications interface 46 of the fourth network node 40 may be operable to allow the processing circuitry 42 of the fourth network node 40 to communicate with the memory 44 of the fourth network node 40 and/or vice versa. Similarly, the communications interface 46 of the fourth network node 40 may be operable to allow the processing circuitry 42 of the fourth network node 40 to communicate with any other nodes referred to herein. The communications interface 46 of the fourth network node 40 can be configured to transmit and/or receive information, data, messages, requests, responses, indications, notifications, signals, or similar, that are described herein. In some embodiments, the processing circuitry 42 of the fourth network node 40 may be configured to control the communications interface 46 of the fourth network node 40 to transmit and/or receive information, data, messages, requests, responses, indications, notifications, signals, or similar, that are described herein.

Although the fourth network node 40 is illustrated in FIG. 8 as comprising a single memory 44, it will be appreciated that the fourth network node 40 may comprise at least one memory (i.e. a single memory or a plurality of memories) 44 that operate in the manner described herein. Similarly, although the fourth network node 40 is illustrated in FIG. 8 as comprising a single communications interface 46, it will be appreciated that the fourth network node 40 may comprise at least one communications interface (i.e. a single communications interface or a plurality of communications interface) 46 that operate in the manner described herein. It will also be appreciated that FIG. 8 only shows the components required to illustrate an embodiment of the fourth network node and, in practical implementations, the fourth network node 40 may comprise additional or alternative components to those shown.

Figure 9:
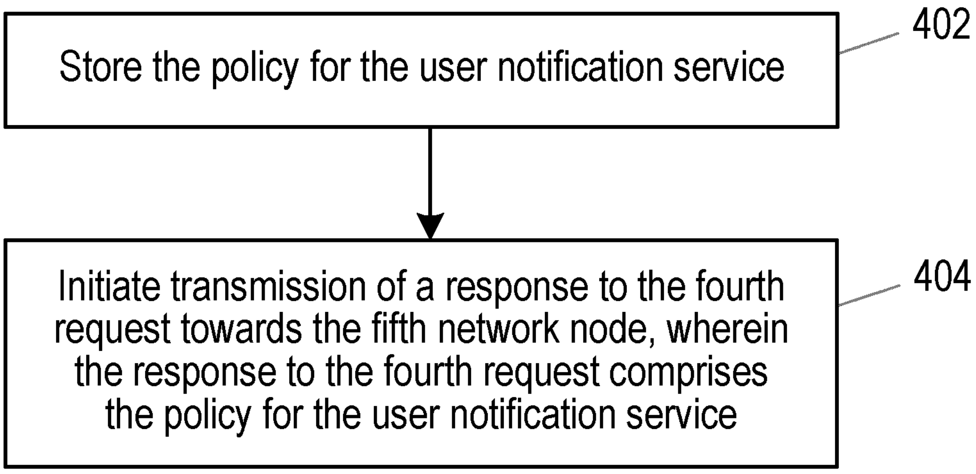
FIG. 9 is a flowchart illustrating a method performed by a fourth network node according to an embodiment.

FIG. 9 is a flowchart illustrating a method performed by a fourth network node 40 in accordance with an embodiment. The method is for handling events in a network. The fourth network node 40 described earlier with reference to FIG. 8 can be configured to operate in accordance with the method of FIG. 9. The method can be performed by or under the control of the processing circuitry 42 of the fourth network node 40 according to some embodiments.

With reference to FIG. 9, as illustrated at block 402, in response to receiving a third request for the fourth network node 40 to store a policy comprising one or more criteria for execution of a user notification service that notifies one or more UEs of events in the network, the policy is stored for the user notification service. More specifically, the processing circuitry 42 of the fourth network node 40 can store the policy, e.g. in the memory 44 of the fourth network node 40, according to some embodiments.

As illustrated at block 404 of FIG. 9, in response to receiving a fourth request for a policy to apply to a communication session in the network that at least one of the one or more UEs requests to establish, where transmission of the fourth request is initiated by a fifth network node operable to provide policies in the network, transmission of a response to the fourth request is initiated towards the fifth network node. More specifically, the processing circuitry 42 of the fourth network node 40 may initiate transmission of (e.g. itself transmit or cause another node to transmit, such as via the communications interface 46 of the fourth network node 40) the response to the fourth request according to some embodiments. The response to the fourth request comprises the policy for the user notification service.

Figure 10:
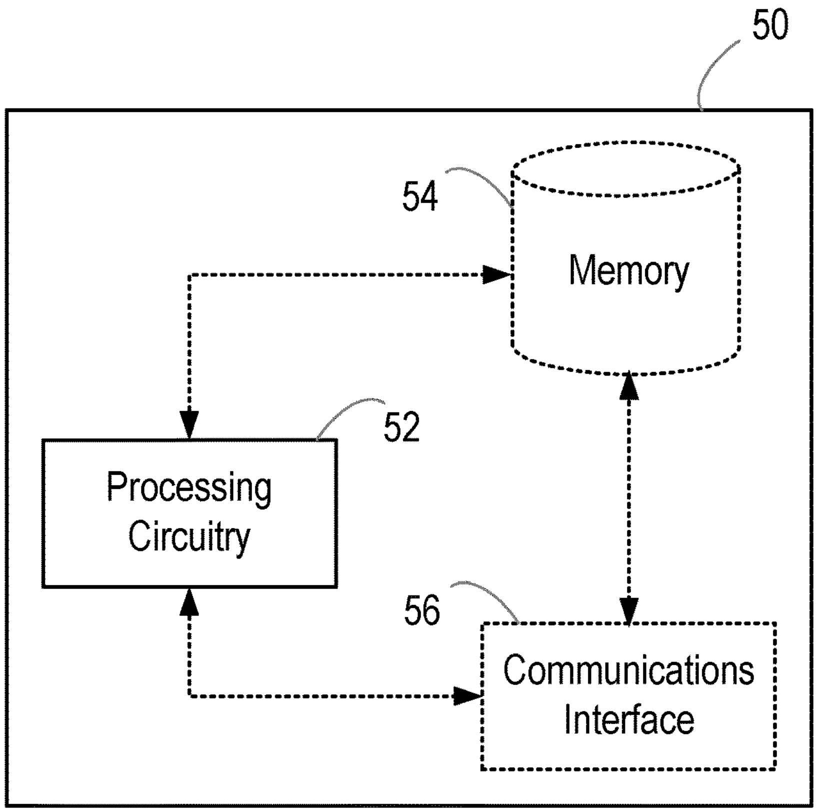
FIG. 10 is a block diagram illustrating a fifth network node according to an embodiment.

FIG. 10 illustrates a fifth network node 50 in accordance with an embodiment. The fifth network node 50 is for handling events in a network. The fifth network node 50 may, for example, be a physical machine (e.g. a server) or a virtual machine (VM). In some embodiments, the fifth network node 50 can be a fifth network node of the network. In a 4G embodiment, the fifth network node 50 can be a policy and charging rule function (PCRF) node. In a 5G embodiment, the fifth network node 50 can be a policy control function (PCF) node. The fifth network node 50 is operable to provide policies in the network.

As illustrated in FIG. 10, the fifth network node 50 comprises processing circuitry (or logic) 52. The processing circuitry 52 controls the operation of the fifth network node 50 and can implement the method described herein in respect of the fifth network node 50. The processing circuitry 52 can be configured or programmed to control the fifth network node 50 in the manner described herein. The processing circuitry 52 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the fifth network node 50. In some embodiments, the processing circuitry 52 can be configured to run software to perform the method described herein in respect of the fifth network node 50. The software may be containerised according to some embodiments. Thus, in some embodiments, the processing circuitry 52 may be configured to run a container to perform the method described herein in respect of the fifth network node 50.

Briefly, the processing circuitry 52 of the fifth network node 50 is configured to, in response to a UE requesting establishment of a communication session in the network, initiate transmission of a fourth request towards a fourth network node 40 operable to store one or more policies for the network. The fourth request is for a policy to apply to the communication session. The processing circuitry 52 of the fifth network node 50 is configured to receive a response to the fourth request. The response to the fourth request comprises a policy and the policy comprises one or more criteria for execution of a user notification service that notifies one or more UEs of events in the network.

As illustrated in FIG. 10, in some embodiments, the fifth network node 50 may optionally comprise a memory 54. The memory 54 of the fifth network node 50 can comprise a volatile memory or a non-volatile memory. In some embodiments, the memory 54 of the fifth network node 50 may comprise a non-transitory media. Examples of the memory 54 of the fifth network node 50 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 52 of the fifth network node 50 can be connected to the memory 54 of the fifth network node 50. In some embodiments, the memory 54 of the fifth network node 50 may be for storing program code or instructions which, when executed by the processing circuitry 52 of the fifth network node 50, cause the fifth network node 50 to operate in the manner described herein in respect of the fifth network node 50. For example, in some embodiments, the memory 54 of the fifth network node 50 may be configured to store program code or instructions that can be executed by the processing circuitry 52 of the fifth network node 50 to cause the fifth network node 50 to operate in accordance with the method described herein in respect of the fifth network node 50. Alternatively or in addition, the memory 54 of the fifth network node 50 can be configured to store any information, data, messages, requests, responses, indications, notifications, signals, or similar, that are described herein. The processing circuitry 52 of the fifth network node 50 may be configured to control the memory 54 of the fifth network node 50 to store information, data, messages, requests, responses, indications, notifications, signals, or similar, that are described herein.

In some embodiments, as illustrated in FIG. 10, the fifth network node 50 may optionally comprise a communications interface 56. The communications interface 56 of the fifth network node 50 can be connected to the processing circuitry 52 of the fifth network node 50 and/or the memory 54 of fifth network node 50. The communications interface 56 of the fifth network node 50 may be operable to allow the processing circuitry 52 of the fifth network node 50 to communicate with the memory 54 of the fifth network node 50 and/or vice versa. Similarly, the communications interface 56 of the fifth network node 50 may be operable to allow the processing circuitry 52 of the fifth network node 50 to communicate with any other nodes referred to herein. The communications interface 56 of the fifth network node 50 can be configured to transmit and/or receive information, data, messages, requests, responses, indications, notifications, signals, or similar, that are described herein. In some embodiments, the processing circuitry 52 of the fifth network node 50 may be configured to control the communications interface 56 of the fifth network node 50 to transmit and/or receive information, data, messages, requests, responses, indications, notifications, signals, or similar, that are described herein.

Although the fifth network node 50 is illustrated in FIG. 10 as comprising a single memory 54, it will be appreciated that the fifth network node 50 may comprise at least one memory (i.e. a single memory or a plurality of memories) 54 that operate in the manner described herein. Similarly, although the fifth network node 50 is illustrated in FIG. 10 as comprising a single communications interface 56, it will be appreciated that the fifth network node 50 may comprise at least one communications interface (i.e. a single communications interface or a plurality of communications interface) 56 that operate in the manner described herein. It will also be appreciated that FIG. 10 only shows the components required to illustrate an embodiment of the fifth network node 50 and, in practical implementations, the fifth network node 50 may comprise additional or alternative components to those shown.

Figure 11:
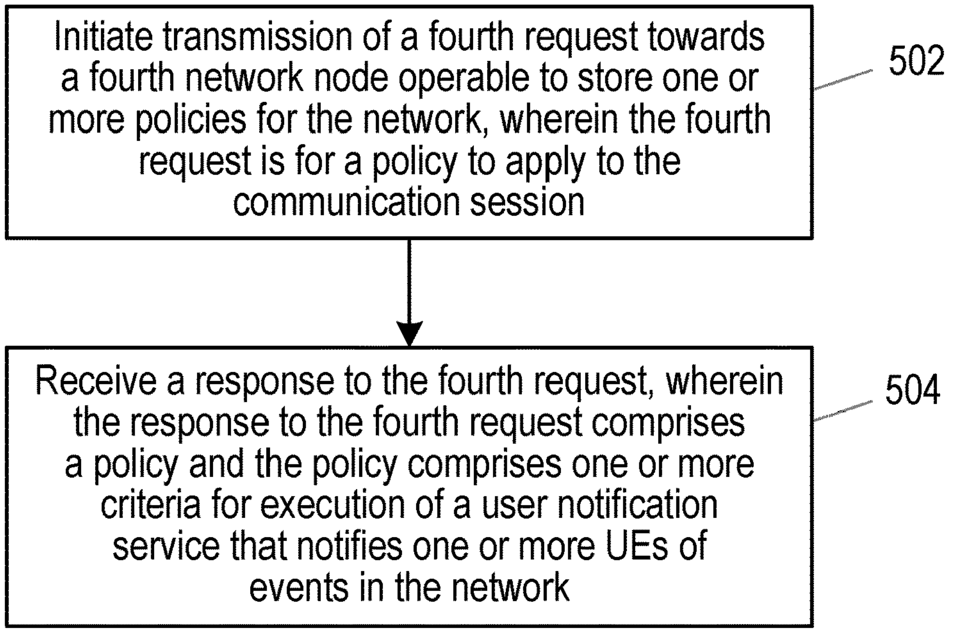
FIG. 11 is a flowchart illustrating a method performed by a fifth network node according to an embodiment.

FIG. 11 is a flowchart illustrating a method performed by a fifth network node 50 in accordance with an embodiment. The method is for handling events in a network. The fifth network node 50 described earlier with reference to FIG. 10 can be configured to operate in accordance with the method of FIG. 11. The method can be performed by or under the control of the processing circuitry 52 of the fifth network node 50 according to some embodiments.

With reference to FIG. 11, as illustrated at block 502, in response to a UE requesting establishment of a communication session in the network, transmission of a fourth request is initiated towards a fifth network node 50 operable to store one or more policies for the network. More specifically, the processing circuitry 52 of the fifth network node 50 may initiate transmission of (e.g. itself transmit or cause another node to transmit, such as via the communications interface 56 of the fifth network node 50) the fourth request according to some embodiments. The fourth request is a request for a policy to apply to the communication session.

As illustrated at block 504 of FIG. 11, a response to the fourth request is received. More specifically, the processing circuitry 52 of the fifth network node 50 may receive (e.g. via the communications interface 56 of the fifth network node 50) the response to the fourth request according to some embodiments. The response to the fourth request comprises a policy and the policy comprises one or more criteria for execution of a user notification service that notifies one or more UEs of events in the network.

There is also provided a system. The system is for handling events in a network. The system can comprise at least one first network node 10 as described earlier, at least one second network node 20 as described earlier, at least one third network node 30 as described earlier, at least one fourth network node 40 as described earlier, and/or at least one fifth network node 50 as described earlier.

Figure 1:
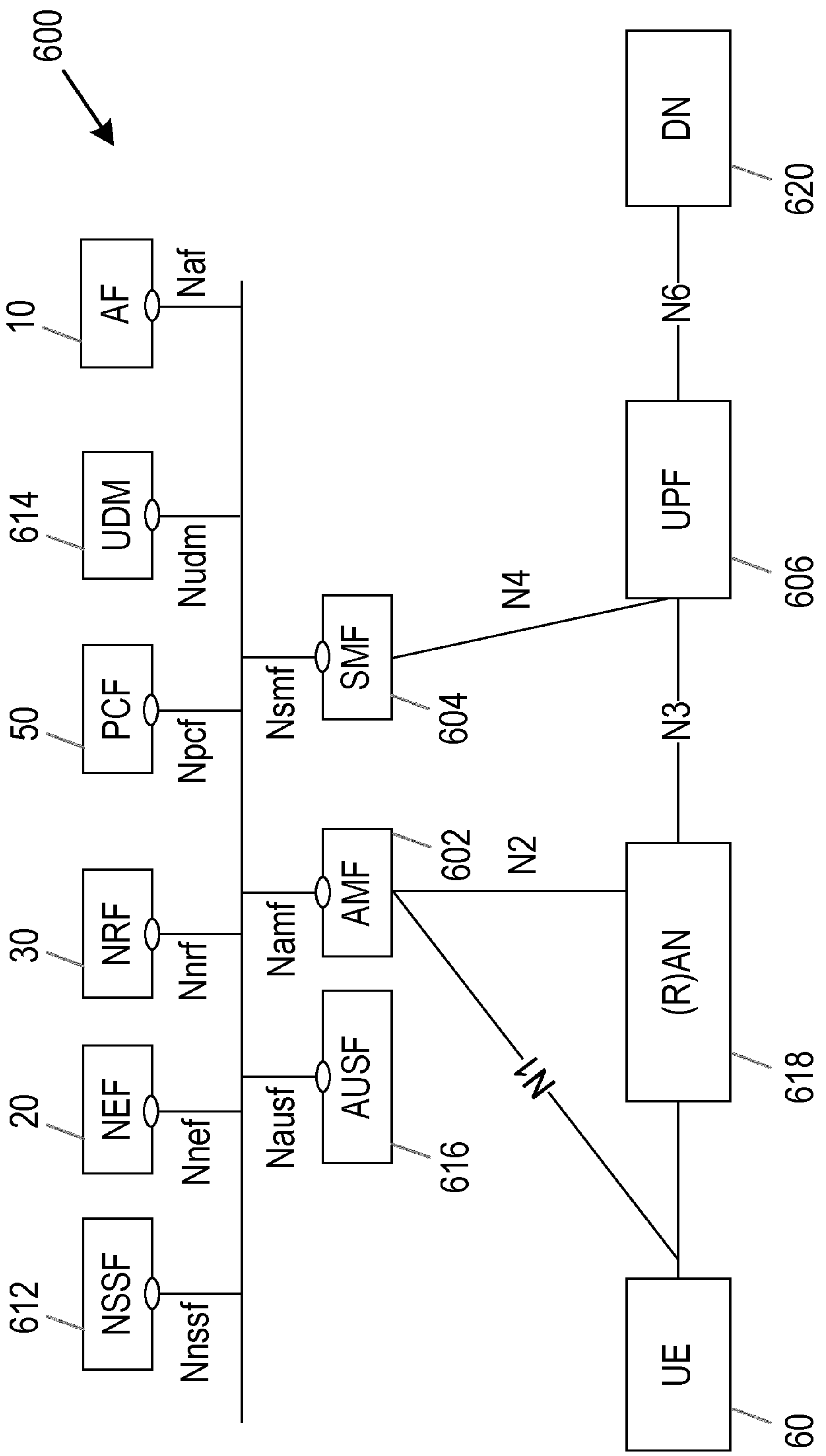
FIG. 1 is a block diagram illustrating an existing 5G network architecture.
Figure 12:
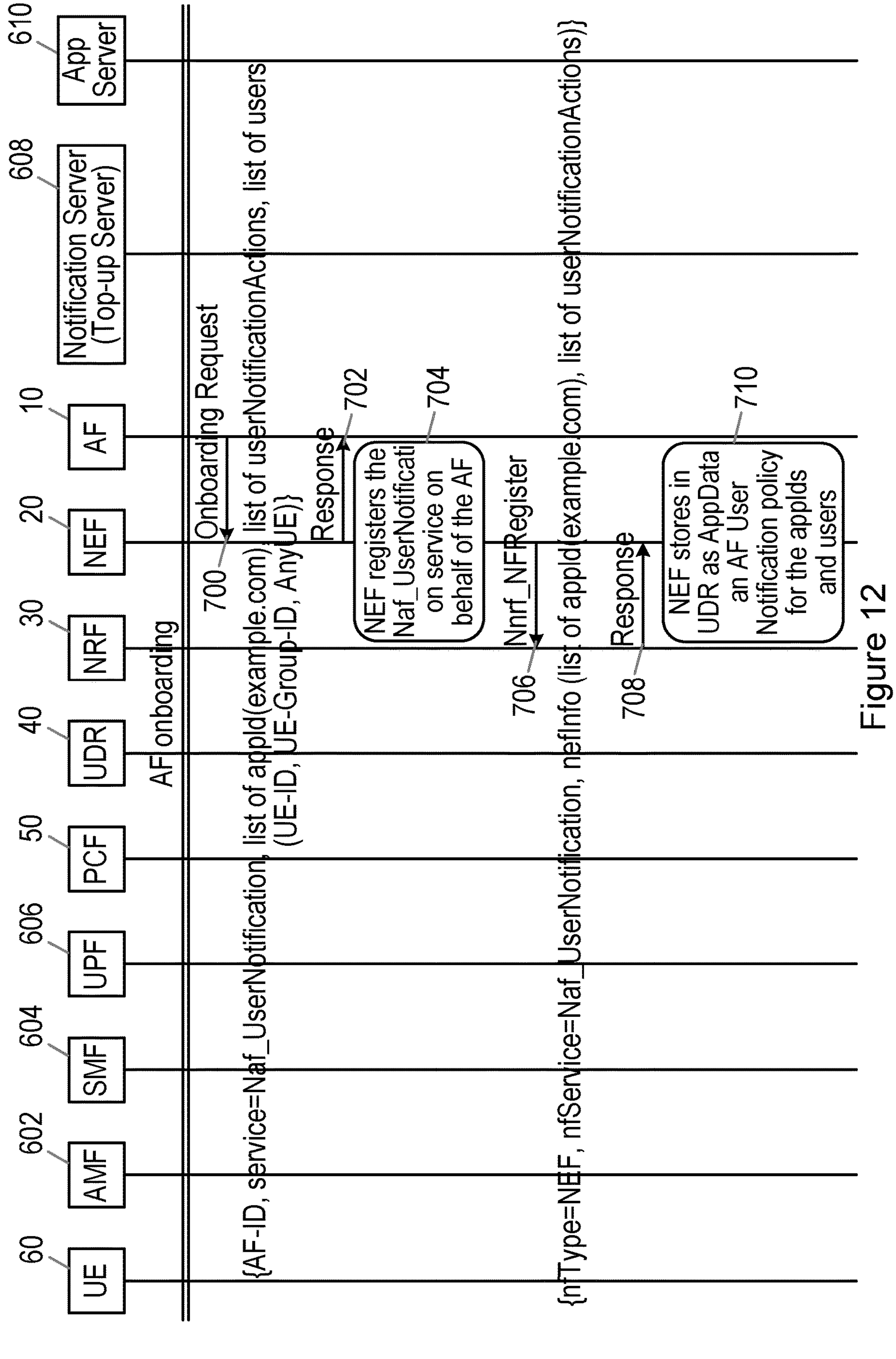
FIG. 12 is a signalling diagram illustrating an exchange of signals in a system according to an embodiment.

FIG. 12 is a signalling diagram illustrating an exchange of signals in a system according to an embodiment. The system is for handling events in a network, such as the 5G network 600 illustrated in FIG. 1. The system illustrated in FIG. 12 comprises the first network node 10 described earlier, the second network node 20 described earlier, the third network node 30 described earlier, the fourth network node 40 described earlier, and the fifth network node 50 as described earlier.

The first network node 10 is external to the network and is configured to communicate with the network via the second network node 20 that is internal to the network. The third network node 30 is operable to support registration procedures in the network. The fourth network node 40 operable to store one or more policies for the network. The fifth network node 50 is operable to provide policies in the network to subscribe to the user notification service. For the purpose of the illustration, the network is assumed to be a 5G network and thus the first network node 10 is an AF node, the second network node is an NEF node, the third network node 30 is an NRF node, the fourth network node is a UDR node, and the fifth network node 50 is a PCF node. However, it will be understood that the network may alternatively be a different generation of network and the same method can be implemented in any generation of network. For example, in the case of a 4G network, the first network node 10 is an SCS/AS instead of an AF node, the second network node 20 is a SCEF node instead of an NEF node, the third network node 30 is a domain name system (DNS) server instead of an NRF node, the fourth network node 40 is a HSS instead of a UDR node, and the fifth network node 50 is a PCRF node instead of a PCF node.

As illustrated in FIG. 12, the system can also comprise a UE 60, an AMF node 602, a SMF node 604, a UPF node 606, a notification server 608 (e.g. a top-up server), and an application server 610. In the case of a 4G network, the AMF node 602 can instead be a mobility management entity (MME), the SMF node 604 can instead be a packet gateway control plane (PGW-C) node or a traffic detection function control plane (TDF-C) node, and the UPF node 606 can be a packet gateway user plane (PGW-U) node or a traffic detection function user plane (TDF-U) node. Although the method will be described with reference to nodes of the 5G network, it will understood that the 5G nodes are interchangeable with the corresponding 4G nodes in the case of a 4G network.

As illustrated by arrow 700 of FIG. 12, the first network node 10 initiates transmission of a first request towards the second network node 20. The first request 700 comprises information indicative that the first network node 10 supports a user notification service that notifies one or more UEs of events in the network. The first request 700 can be referred to as an onboarding request. Thus, the first network node 10 triggers an onboarding procedure into second network node 20 indicating the support of a new service, namely the user notification service ("Naf_UserNotification service"). In this way, the first network node 10 can implement a new user notification service. The new notification service can allow request/response and subscribe/notify operations from the fifth network node 50 (through the second network node 20).

In some embodiments, the first request 700 referred to herein may comprise an identifier that identifies the first network node 10, one or more identifiers that each identify an application to which the first network node 10 is capable of providing the user notification service, information indicative of one or more actions supported by the user notification service to notify one or more UEs of events in the network, one or more identifiers that each identify a UE to which the first network node 10 is capable of initiating one or more actions to notify the UE of events in the network, one or more identifiers that each identify a group of UEs to which the first network node 10 is capable of initiating one or more actions to notify the group of UEs of events in the network, and/or information indicative that an operator of the network is to trigger the user notification service. The parameters mentioned here and described in more detail below can be referred to herein as input parameters.

The one or more identifiers ("appId") that each identify an application can be in the form of a list in some embodiments. These one or more identifiers make it possible to determine the application(s) to which the first network node 10 can provide the user notification service. The one or more identifiers (UE-ID) that each identify a UE and/or the one or more identifiers (UE-Group-ID) that each identify a group of UEs may be in the form of a list in some embodiments. These one or more identifiers make it possible to determine the UE(s) to which the first network node 10 can provide the user notification service. In some embodiments, it may be any UE to which the first network node 10 can provide the user notification service.

In some embodiments, the one or more actions (which may also be referred to as one or more user notification actions) supported by the user notification service may comprise any one or more of the following:

- An action to transmit a message (a user notification message, such as "Action X has occurred", e.g. "You have run out of quota") towards the one or more UEs to notify the one or more UEs of events in the network. In some embodiments, the message may be directly conveyed to the one or more UEs, without the need to trigger a connection towards a notification server (e.g. a top-up server).
- An action to transmit a message (a redirection message) towards a server (e.g. the notification server 608), where the message requests that the server notifies the one or more UEs of events in the network. In some embodiments, the message may comprise a uniform resource identifier (URI) for the server, a uniform resource locator (URL) for the server, and/or an internet protocol (IP) address for the server. In this way, the server to which the UE needs to connect for notification purposes can be determined from the message.
- An action to transmit a predefined type of user notification message, such as one-time notification or continuous notification. For example, an action to continuously transmit the user notification message and/or the redirection message (e.g. once for each event), an action to transmit the user notification message and/or the redirection message one time only. For example, in some cases, the user notification message may need to be triggered continuously (e.g. in a case where the user is out of quota and needs to be continuously redirected). In other cases, the user notification message may only need to be triggered once (e.g. in case of EU roaming regulation).

An action to control access, such as an action to allow access or block access. This may be referred to as a user notification access control policy. An example of an action to allow or block access may be an action to allow or block (e.g. application) traffic to and/or from the one or more UEs while the one or more UEs are notified of events in the network, i.e. while the user notification service is active or being executed.

As mentioned earlier, in some embodiments, the first request 700 referred to herein may comprise information indicative that an operator of the network is to trigger the user notification service, e.g. towards at least one of the one or more UEs. Thus, the first network node 10 indicated to the network operator that the user notification service is to be applied at the application client side according to some embodiments.

As illustrated by arrow 702 of FIG. 12, in some embodiments, the second network node may initiate transmission of a response to the first request 700 towards the first network node 10. The first network node 10 thus receives a response to the first request 700. The response 702 to the first request 700 comprises information indicative that the second network node 20 received the first request 700. Thus, the second network node may acknowledge the first request 700.

As illustrated by block 704 of FIG. 12, in some embodiments, the second network node may register the user notification service (on behalf of the first network node 10) at the third network node 30 after the onboarding procedure. Although not illustrated in FIG. 12, in other embodiments, the first network node 10 may itself register the user notification service at the third network node 30. Thus, as illustrated by arrow 706 of FIG. 12, in response to receiving the first request 700, the second network node 20 initiates transmission of a second request towards the third network node 30. In some embodiments, the second network node 20 may initiate transmission of the second request 706 if the first network node 10 is untrusted by the third network node 30. Although not illustrated in FIG. 12, in other embodiments, the first network node 10 may initiate transmission of the second request towards the third network node 30. In some embodiments, the first network node 10 may initiate transmission of the second request if the first network node 10 is trusted by the third network node 30. Thus, if the first network node 10 is trusted, it may directly register the user notification service at the third network node 30.

The second request referred to herein is to register the user notification service at the third network node 30. In some embodiments, the second request 706 referred to herein may comprise information indicative of a node type (nfType, e.g. nfType=NEF) for the second network node 20, information indicative that a service to be registered is the user notification service (nfService=Naf_UserNotification), and/or one or more identifiers that each identify an application to which the first network node 10 is capable of providing the user notification service (nefInfo{list of appId(example-.com)}).

Although not illustrated in FIG. 12, in response to receiving the second request 706, the third network node 30 registers the user notification service at the third network node 30. In some embodiments, the user notification service may be registered for one or more applications to which the first network node 10 is capable of providing the user notification service.

As illustrated by arrow 708 of FIG. 12, in some embodiments, the third network node may initiate transmission of a response to the second request 706 towards the second network node 20. Although not illustrated in FIG. 12, alternatively or in addition, in some embodiments, the third network node 30 may initiate transmission of the response to the second request 706 towards the first network node 10. For example, the third network node 30 may initiate transmission of the response to the second request 706 towards the network node that initiated transmission of the second request 706. The response 708 to the second request 706 comprises information indicative that the third network node 30 received the second request 706. Thus, the third network node 30 may acknowledge the second request 706.

As illustrated by block 710 of FIG. 12, in some embodiments, the second network node may store (e.g. at the fourth network node 40) a policy comprising one or more criteria for execution of the user notification service. The policy may also be referred to as a user notification policy. Thus, as illustrated by arrow 712 of FIG. 12, in response to receiving the first request 700, the second network node 20 initiates transmission of a third request towards the fourth network node 40. The third request 712 referred to herein is for the fourth network node 40 to store a policy comprising one or more criteria for execution of the user notification service. Although not illustrated in FIG. 12, in response to receiving the third request 712, the fourth network node 40 stores the policy for the user notification service. The policy for the user notification service may be stored as application data (AppData). In some embodiments, the policy may be stored for the application(s), user(s), and/or groups of user(s) identified earlier.

In some embodiments, the policy for the user notification service may be for one or more applications. In some embodiments, the one or more criteria referred to herein may comprise a criteria for the first network node 10 to transmit a message towards the one or more UEs to notify the one or more UEs of events in the network, a criteria for the first network node 10 to transmit a message towards the server 608 requesting that the server 608 notifies the one or more UEs of events in the network, a criteria that the one or more UEs are notified of events in the network continuously or only once for each event, and/or a criteria that traffic to and/or from the one or more UEs is blocked or allowed while the one or more UEs are notified of events in the network.

In some embodiments, the third request 712 referred to herein may comprise information indicative that a service to be registered is the user notification service, one or more identifiers that each identify an application to which the first network node 10 is capable of providing the user notification service, one or more identifiers that each identify a UE to which the first network node 10 is capable of initiating one or more actions to notify the UE of events in the network, and/or one or more identifiers that each identify a group of UEs to which the first network node 10 is capable of initiating one or more actions to notify the group of UEs of events in the network. As illustrated by arrow 714 of FIG. 12, in some embodiments, the fourth network node 40 may initiate transmission of a response to the third request 712 towards the second network node 20. Thus, the fourth network node 40 may acknowledge the third request 712.

As illustrated by arrow 716 of FIG. 12, in some embodiments, a UE 60 may trigger communication (e.g. PDU) session establishment. For example, the UE 60 may initiate transmission of a communication (e.g. PDU) session establishment request to the AMF node 602. As illustrated by arrow 718 of FIG. 12, in some embodiments, the AMF node 602 may select an SMF node 604 to manage the communication (e.g. PDU) session and may initiate transmission of a message requesting that the communication (e.g. PDU) session is created. As illustrated by arrow 720 of FIG. 12, in some embodiments, the SMF node 604 may select a fifth network node 50 and initiate transmission of a message ("Npcf_SMPolicyControl_Create Request") requesting retrieval of one or more policies for the communication session. The fifth network node 50 may then initiate transmission of a message ("Nudr_Query Request") to request retrieval of the policy data for the communication session.

Thus, as illustrated by arrow 722 of FIG. 12, in response to the UE requesting 716 establishment of a communication session in the network, the fifth network node 50 initiates transmission of a fourth request 722 towards the fourth network node 40. The fourth request 722 referred to herein is a request for a policy to apply to the communication session.

As illustrated by arrow 724 of FIG. 12, in response to receiving the fourth request 722, the fourth network node 40 initiates transmission of a response ("Nudr_Query Response") to the fourth request 722 towards the fifth network node 50. Thus, the fifth network node 50 receives the response to the fourth request 722. The response 724 to the fourth request 722 referred to herein comprises the policy for the user notification service. In some embodiments, the policy for the user notification service may be for one or more applications (e.g. for appId {example.com}). In some embodiments, the response 724 to the fourth request 722 referred to herein may comprise a profile for the UE, i.e. the UE (or subscriber) profile.

As illustrated by block 726 of FIG. 12, in some embodiments, the fifth network node 50 may store the policy for the user notification service. In some embodiments, the policy for the user notification service may be stored for one or more applications (e.g. example.com). As illustrated by block 728 of FIG. 12, in some embodiments, the UE 6 may start an application (e.g. example.com), such as over TLS or QUIC. As illustrated by arrow 730 of FIG. 12, in some embodiments, the UE 6 may transmit traffic for the application towards the UPF node 606. As illustrated by block 732 of FIG. 12, the UPF node 606 may detect the application traffic, e.g. by matching an uplink packet detection rule (UL PDR) with packet detection information (PDI), and may store accumulated volume for the application. As illustrated by arrow 734 of FIG. 12, in some embodiments, the UPF node 606 may transmit the application traffic towards the application server 610.

As illustrated by arrow 736 of FIG. 12, in some embodiments, when the URR threshold (e.g. periodic or volume threshold) is reached, the UPF node 606 may trigger a URR report, which comprises the volume for the application. As illustrated by arrow 738 of FIG. 12, in some embodiments, the UPF node 606 may transmit a request towards the SMF node 604. The request 738 is a PFCP session report request and it comprises the URR report. As illustrated by arrow 740 of FIG. 12, in some embodiments, the SMF node 604 may answer by transmitting a response towards the UPF node 606. The response 740 is a PFCP session report response. As illustrated by arrow 742 of FIG. 12, in some embodiments, the SMF node 604 may report the application volume to the fifth network node 50, e.g. in a Npcf_SMPolicyControl_Update Request message. As illustrated by arrow 744 of FIG. 12, in some embodiments, the fifth network node 50 may answer back to the SMF node 604, e.g. with a Npcf_SMPolicyControl_Update Response message.

As illustrated by block 746 of FIG. 12, in some embodiments, the fifth network node 50 may detect one or more events in the network. In some embodiments, in response to detection of one or more events in the network, the fifth network node 50 may trigger execution of the user notification service in accordance with the one or more criteria of the policy. The one or more events in the network may be associated with one or more applications, such as for a particular application (e.g. appId=example.com). For the purpose of the illustration, it is assumed that the event that the fifth network node 50 may detect is that the UE has run out of quota, such as for a particular application (e.g. appId=example.com). The fifth network node 50 may trigger execution of the user notification service each time an action is detected according to some embodiments.

As illustrated by arrow 748 of FIG. 12, in some embodiments, the fifth network node 50 may initiate transmission of a second message towards the third network node 30. The second message 748 referred to herein is a request for information indicative of a second network node 20 via which the first network node 10 that supports the user notification service communicates with the network. Thus, the fifth network node 50 triggers discovery of the first network node 10 through the second network node 20 relative to the user notification service. The first network node 10 may be capable of providing the user notification service to the one or more applications that are associated with the one or more events in the network. In some embodiments, the second message 748 may comprise information indicative of a node type for the second network node 20 (e.g. nfType=NEF), information indicative that a service to be registered is the user notification service (e.g. nfService=Naf_UserNotification), and/or one or more identifiers that each identify an application to which the first network node 10 is capable of providing the user notification service (e.g. nefInfo {appId=example.com}).

As illustrated by arrow 750 of FIG. 12, in some embodiments, in response to receiving the second message 748, the third network node 30 may initiate transmission of a response to the second message towards the fifth network node 50. Thus, the fifth network node 50 receives the response 750 to the second message 748. The response 750 to the second message 748 referred to herein comprises information indicative of the second network node 20. For example, the third network node 30 may return the instance of the second network node 20 to the fifth network node 50. Thus, as a result of the discovery process, the fifth network node 50 obtains information indicative of the second network node 20.

As illustrated by arrow 752 of FIG. 12, in some embodiments, the fifth network node 50 may initiate transmission of a first message towards the second network node 20. The first message 752 referred to herein is a request for the fifth network node 50 to subscribe to the user notification service. Thus, in some embodiments, the fifth network node 50 can subscribe to the user notification service through the second network node 20 by transmitting this first message towards the second network node 20. Thus, once the information indicative of the second network node 20 is obtained, the fifth network node 50 can trigger either a request/response or subscribe/notify operation to the user notification service.

In some embodiments, the first message 752 referred to herein may comprise information indicative that a service the fifth network node 50 requests to subscribe is the user notification service (e.g. Naf_UserNotification service), one or more identifiers that each identify an application to which the user notification service is to be provided (e.g. appId=example.com), one or more identifiers that each identify a UE that is to be notified of events in the network (e.g. UE-ID), one or more identifiers that each identify a group of UEs that is to be notified of events in the network, and/or the policy comprising one or more criteria for execution of the user notification service (e.g. userNotificationPolicy). For example, the one or more criteria may comprise one or more of a notification server URI (as user notification source), continuous notification (as user notification type), block (as user notification access control policy), and/or any other criteria for execution of the user notification service. The parameters included in the first message 752 can comprise any one or more of the input parameters described earlier.

In the illustrated example, the network operator does not want to be explicitly notified by the content provider that the user notification action has been effectively applied. However, in some embodiments, if the network operator does want to be explicitly notified, the network operator may trigger a subscribe/notify (and not a request/response) procedure.

As illustrated by arrow 754 of FIG. 12, in some embodiments, in response to receiving the first message 752, the second network node 20 initiates transmission of the first message towards the first network node 10. Thus, in some embodiments, the second network node 20 may trigger a request to the user notification service by sending the first message 754 towards the first network node 10. In some embodiments, the first message 754 transmitted by the second network node 20 may comprise any one or more of the parameters received in the first message 752 from the fifth network node 50.

As illustrated by block 756 of FIG. 12, in some embodiments, in response to receiving the first message 754, the first network node 10 may initiate execution of the user notification service to notify one or more UEs of one or more events in the network, e.g. in accordance with the policy for the user notification service. In some embodiments, the user notification service may be initiated via the application server 610 and/or an application client. In these embodiments, the application server 610 and/or an application client can execute the user notification service. Thus, in some embodiments, at block 756 of FIG. 12, the first network node 10 may interact with the application server 610 and/or the application client to apply the requested execution of the user notification service, e.g. in accordance with the policy for the user notification service, in respect of one or more applications (e.g. appId) and/or in respect of one or more UEs (UE-ID).

In some embodiments, the first network node 10 may decide to accept or reject the request from the fifth network node 50. This can depend on whether the operation has been successful or unsuccessful. In some embodiments, if the first network node 10 accepts the request, the first network node 10 may trigger the procedure to initiate execution of the user notification service to notify one or more UEs of one or more events in the network, as described above.

As illustrated by arrow 758 of FIG. 12, in some embodiments, the first network node 10 may initiate transmission of a response towards the second network node 20 to indicate that the first network node 10 accepts the request to initiate execution of the user notification service. In other embodiments, the response 758 may indicate that the first network node 10 rejects the request to initiate execution of the user notification service. In some embodiments, the response 758 may also comprise (e.g. in the case of a subscribe operation), information indicative that the requested user notification action has been effectively applied (or not) by the content provider (e.g. user notification in case of a roaming regulation). The parameters included in the response can be referred to herein as output parameters. As illustrated by arrow 760 of FIG. 12, in some embodiments, the second network node 20 may initiate transmission of the response indicating the acceptance (or rejection) towards the fifth network node 50.

As illustrated by arrow 762 of FIG. 12, in some embodiments, the UE 60 (e.g. an application at the UE, such as example.com) may trigger a (e.g. HTTP or HTTPS) GET request towards the application server 610 and/or an application client. As illustrated by block 764 of FIG. 12, in some embodiments, in response to this request, the application server 610 may execute the user notification service to notify one or more UEs of one or more events in the network. That is, the first network node 10 may trigger application of the user notification service, e.g. in respect of at least one of the one or more UEs. In one example, the application server 610 may trigger redirection to the notification server 608. As illustrated by arrow 766 of FIG. 12, in some embodiments, the application server 610 may do this by initiating transmission of a message (e.g. a HTTP or HTTPs) message towards the UE 60 and this message can comprise information that identifies the notification server 608, such as a URI for the notification server 608. In case of a subscribe operation, the first network node 10 may notify the fifth network node 50 (through the second network node 20) that the user notification service has been effectively applied (or not), such as by the content provider (e.g. user notification in case of a roaming regulation).

As illustrated by arrow 768 of FIG. 12, in some embodiments, the UE 60 (or an application at the UE, such as example.com) may initiate transmission of the (e.g. HTTP or HTTPS) GET request towards the notification server 608 as requested by the message received from the application server 610. As illustrated by block 770 of FIG. 12, in some embodiments, the notification server 608 may generate a message to indicate the one or more actions detected in the network, e.g. that the UE 60 is out of quota for the application. The message may also indicate a suggestion in relation to the one or more actions, such as refilling the UE 60 to continue using the application for the case where the UE 60 is out of quota for the application. As illustrated by arrow 772 of FIG. 12, in some embodiments, the notification server 608 may initiate transmission of the generated message towards the UE 60. The (e.g. HTTP or HTTPS) 200 OK message may comprise the generated message.

Although not illustrated in FIG. 12, in some embodiments, the policy for the user notification servicer may be triggered by the fifth network node 50 and transmitted towards the UE 60, e.g. through the AMF node 602. This allows an operator of the network to request a content provider (e.g. an application client) to apply the policy for the traffic of the UE, e.g. on a per application basis.

There is also provided a computer program comprising instructions which, when executed by processing circuitry (such as the processing circuitry of any one or more of the nodes described earlier), cause the processing circuitry to perform at least part of the method described herein. There is provided a computer program product, embodied on a non-transitory machine-readable medium, comprising instructions which are executable by processing circuitry (such as the processing circuitry of any one or more of the nodes described earlier) to cause the processing circuitry to perform at least part of the method described herein. There is provided a computer program product comprising a carrier containing instructions for causing processing circuitry (such as the processing circuitry of any one or more of the nodes described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the node functionality described herein can be performed by hardware. Thus, in some embodiments, any one or more of the nodes described herein can be a hardware node. However, it will also be understood that optionally at least part or all of the node functionality described herein can be virtualized. For example, the functions performed by any one or more of the nodes described herein can be implemented in software running on generic hardware that is configured to orchestrate the node functionality. Thus, in some embodiments, any one or more of the nodes described herein can be a virtual node. In some embodiments, at least part or all of the node functionality described herein may be performed in a network enabled cloud. Thus, the method described herein can be realised as a cloud implementation according to some embodiments. For any one or more of the nodes described herein, the node functionality described herein may all be at the same location or at least some of the node functionality may be distributed, e.g. the node functionality described herein may be performed by one or more different entities.

It will be understood that at least some or all of the method steps described herein can be automated in some embodiments. That is, in some embodiments, at least some or all of the method steps described herein can be performed automatically. The method described herein can be a computer-implemented method.

Therefore, in the manner described herein, there is advantageously provided a technique for handling events in a network. The technique described herein can be an extension of the exposure policy framework and, more specifically, a user notification policy triggered by the fifth network node 50 and sent towards the first network node 10 through the second network node 20. This can allow a network operator to request that a content provider notify a UE, e.g. on a per application basis, in a simple and efficient way. Moreover, the technique described herein allows a network operator to support user notification policies for user traffic in a simple an efficient way. The technique described herein can be used even when traffic is encrypted (e.g. HTTPS/TLS or QUIC).

It should be noted that the above-mentioned embodiments illustrate rather than limit the idea, and that those skilled in the art will be able to design many alternative embodiments without departing from the scope of the appended claims. The word “comprising” does not exclude the presence of elements or steps other than those listed in a claim, “a” or “an” does not exclude a plurality, and a single processor or other unit may fulfil the functions of several units recited in the claims. Any reference signs in the claims shall not be construed so as to limit their scope.

The invention claimed is:

1. A method for event notification in a network, wherein the method is performed by a second network node that is internal to the network and via which a first network node that is external to the network is configured to communicate with the network, the method comprising:

receiving a first request from the first network node for onboarding a user notification service, wherein the first request comprises information indicative that the first network node supports the user notification service that notifies one or more user equipments, UEs, of events in the network; and initiating transmission of a second request towards a third network node operable to support registration procedures in the network wherein the second request is to register the user notification service at the third network node, wherein the second request comprises:

information indicative of a node type for the second network node;

information indicative that a service to be registered is the user notification service; and/or one or more identifiers that each identify an application to which the first network node is capable of providing the user notification service.

2. A method as claimed in claim 1, wherein:

transmission of the second request is initiated if the first network node is untrusted by the third network node.

3. A method as claimed in claim 1, wherein:

the first request comprises:

an identifier that identifies the first network node;

one or more identifiers that each identify an application to which the first network node is capable of providing the user notification service;

information indicative of one or more actions supported by the user notification service to notify one or more UEs of events in the network;

one or more identifiers that each identify a UE to which the first network node is capable of initiating one or more actions to notify the UE of events in the network;

one or more identifiers that each identify a group of UEs to which the first network node is capable of initiating one or more actions to notify the group of UEs of events in the network; and/or information indicative that an operator of the network is to trigger the user notification service.

4. A method as claimed in claim 1, the method comprising:

initiating transmission of a response to the first request towards the first network node, wherein the response to the first request comprises information indicative that the second network node received the first request.

5. A method as claimed in claim 1, the method comprising:

in response to receiving a first message, wherein the first message is a request for a fifth network node operable to provide policies in the network to subscribe to the user notification service:

initiating transmission of the first message towards the first network node.

6. A method as claimed in claim 5, wherein:

the first message comprises:

information indicative that a service the fifth network node requests to subscribe is the user notification service;

one or more identifiers that each identify an application to which the user notification service is to be provided;

one or more identifiers that each identify a UE that is to be notified of events in the network;

one or more identifiers that each identify a group of UEs that is to be notified of events in the network; and/or the policy comprising one or more criteria for execution of the user notification service.

7. A method as claimed in claim 1, further comprising: initiating transmission of a third request towards a fourth network node operable to store one or more policies for the network, wherein the third request is for the fourth network node to store a user notification policy comprising one or more criteria for execution of the user notification service.

8. A method as claimed in claim 7, wherein:

the one or more criteria comprise:

a criteria for the first network node to transmit a message towards the one or more UEs to notify the one or more UEs of events in the network;

a criteria for the first network node to transmit a message towards a server requesting that the server notifies the one or more UEs of events in the network;

a criteria that the one or more UEs are notified of events in the network continuously or only once for each event; and/or a criteria that traffic to and/or from the one or more UEs is blocked or allowed while the one or more UEs are notified of events in the network.

9. A method as claimed in claim 7, wherein:

the third request comprises:

information indicative that a service to be registered is the user notification service;

one or more identifiers that each identify an application to which the first network node is capable of providing the user notification service;

one or more identifiers that each identify a UE to which the first network node is capable of initiating one or more actions to notify the UE of events in the network; and/or one or more identifiers that each identify a group of UEs to which the first network node is capable of initiating one or more actions to notify the group of UEs of events in the network.

* * * * *